(12) United States Patent
Nakahashi et al.

(10) Patent No.: US 7,280,121 B2
(45) Date of Patent: Oct. 9, 2007

(54) IMAGE PROCESSING APPARATUS AND METHOD OF SAME

(75) Inventors: Teruyuki Nakahashi, Tokyo (JP); Osamu Watanabe, Tokyo (JP); Tanio Nagasaki, Tokyo (JP); Tetsugo Inada, Tokyo (JP); Yasuhiro Moriyama, Tokyo (JP); Hideshi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 10/947,985

(22) Filed: Sep. 23, 2004

(65) Prior Publication Data

US 2005/0068333 A1 Mar. 31, 2005

(30) Foreign Application Priority Data

Sep. 25, 2003 (JP) ............................ P2003-334203

(51) Int. Cl.
*G09G 5/00* (2006.01)
(52) U.S. Cl. ...................................... 345/611
(58) Field of Classification Search ............... None
See application file for complete search history.

(56) References Cited

U.S. PATENT DOCUMENTS

| | | | |
|---|---|---|---|
| 4,780,711 A | | 10/1988 | Doumas |
| 5,123,085 A | | 6/1992 | Wells et al. |
| 5,325,474 A | * | 6/1994 | Kumazaki et al. .......... 345/611 |
| 5,668,940 A | | 9/1997 | Steiner et al. |
| 5,903,276 A | * | 5/1999 | Shiraishi ...................... 345/600 |
| 6,700,672 B1 | * | 3/2004 | Jones et al. .................. 358/1.1 |
| 6,982,723 B1 | * | 1/2006 | Szymaniak .................. 345/611 |
| 2002/0167532 A1 | | 11/2002 | Stroyan |
| 2003/0095134 A1 | | 5/2003 | Tuomi et al. |

FOREIGN PATENT DOCUMENTS

| | | |
|---|---|---|
| EP | 0 600 709 A2 | 6/1994 |
| EP | 1 094 421 A2 | 4/2001 |

\* cited by examiner

*Primary Examiner*—Mark Zimmerman
*Assistant Examiner*—Jwalant Amin
(74) *Attorney, Agent, or Firm*—Finnegan, Henderson, Farabow, Garrett & Dunner, L.L.P.

(57) ABSTRACT

An image processing apparatus capable of realizing accurate anti-aliasing with a small memory, without being affected by the order of drawing, and without inducing a drop in the drawing speed, including an anti-aliasing system obtaining edge information from an image after drawing, determining a processing content necessary for the anti-aliasing, and performing the determined processing. Specifically, either of the information of a z-buffer and the information of the normal vector at each pixel obtained at the time of drawing, or both information, is scanned or by the information of normal vectors restored from the information of the z-buffer is used, a state machine for holding the state and a counter for measuring the continuity of an edge are prescribed, the value of which pixel adjacent in which direction to each pixel on each edge and what kind of ratio to use for blending are determined, and the determined values are used for blending. This is performed successively until the pixel values are updated.

13 Claims, 17 Drawing Sheets

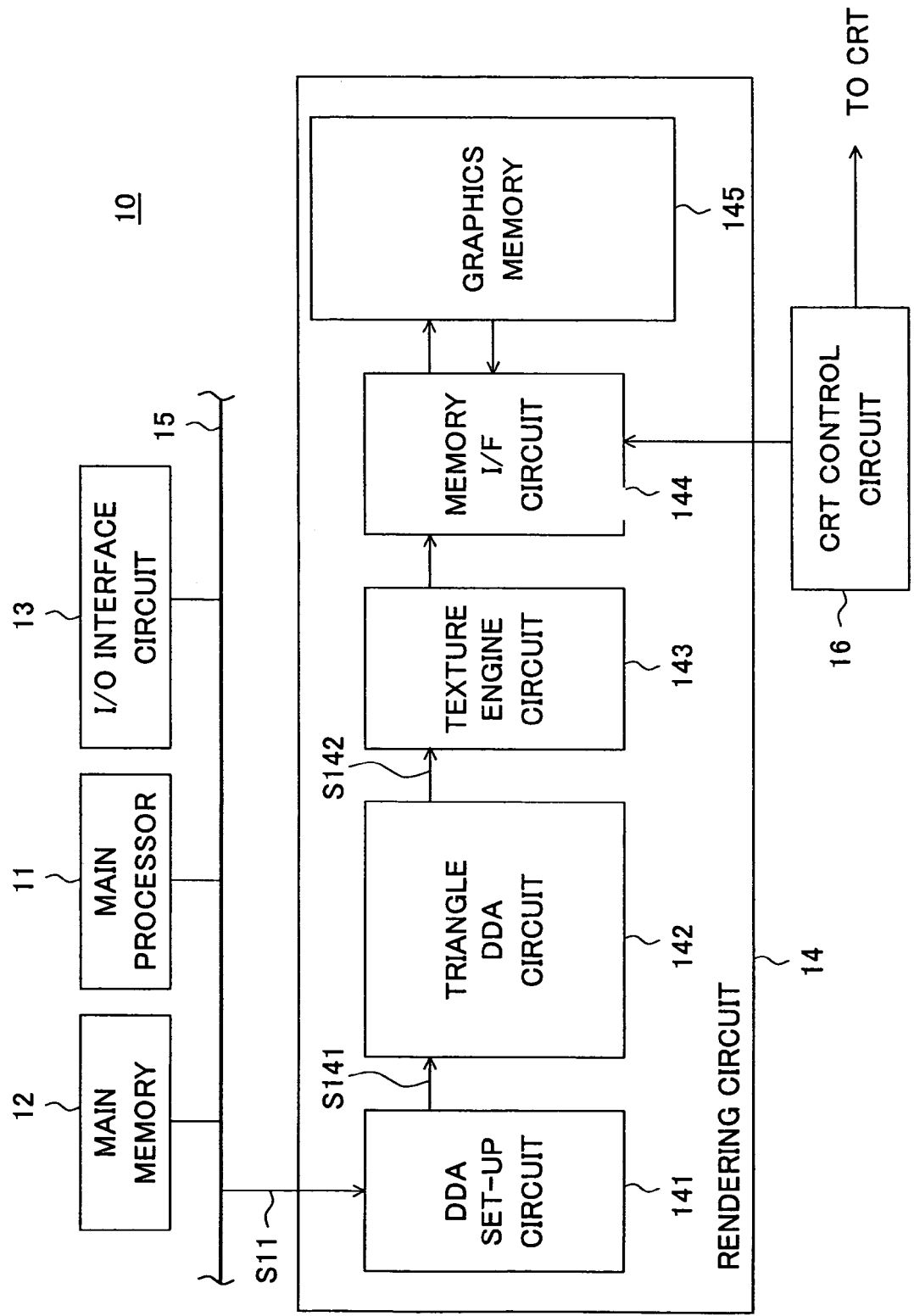

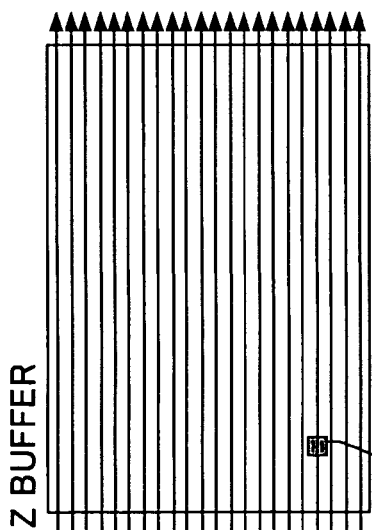
$$d2z = 4*z(x,y) - z(x,y-1) - z(x,y+1) - z(x-1,y) - z(x+1,y)$$
$$d2zdx = 2 * z(x,y) - z(x-1,y) - z(x+1,y)$$
$$d2zdy = 2 * z(x,y) - z(x,y-1) - z(x,y+1)$$
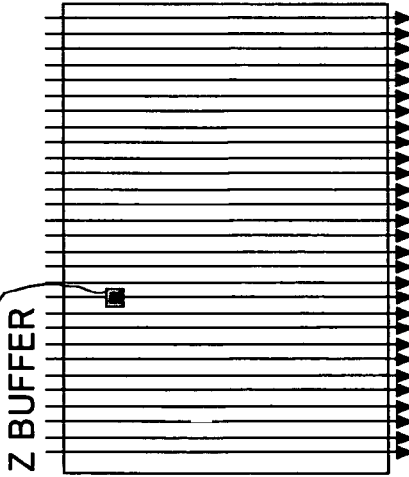
FIG. 3A
FIG. 3B
FIG. 3C $(nx0, ny0, nz0) = (\ ((x2,y2,z2) - (x0,y0,z0)\ ) \times (\ (x1,y1,z1) - (x0,y0,z0)\ )\ )$ $nx0 = (y2-y0) * (z1-z0) - (z2-z0) * (y1-y0)$
$ny0 = (z2-z0) * (x1-x0) - (x2-x0) * (z1-z0)$
$nz0 = (x2-x0) * (y1-y0) - (y2-y0) * (x1-x0)$

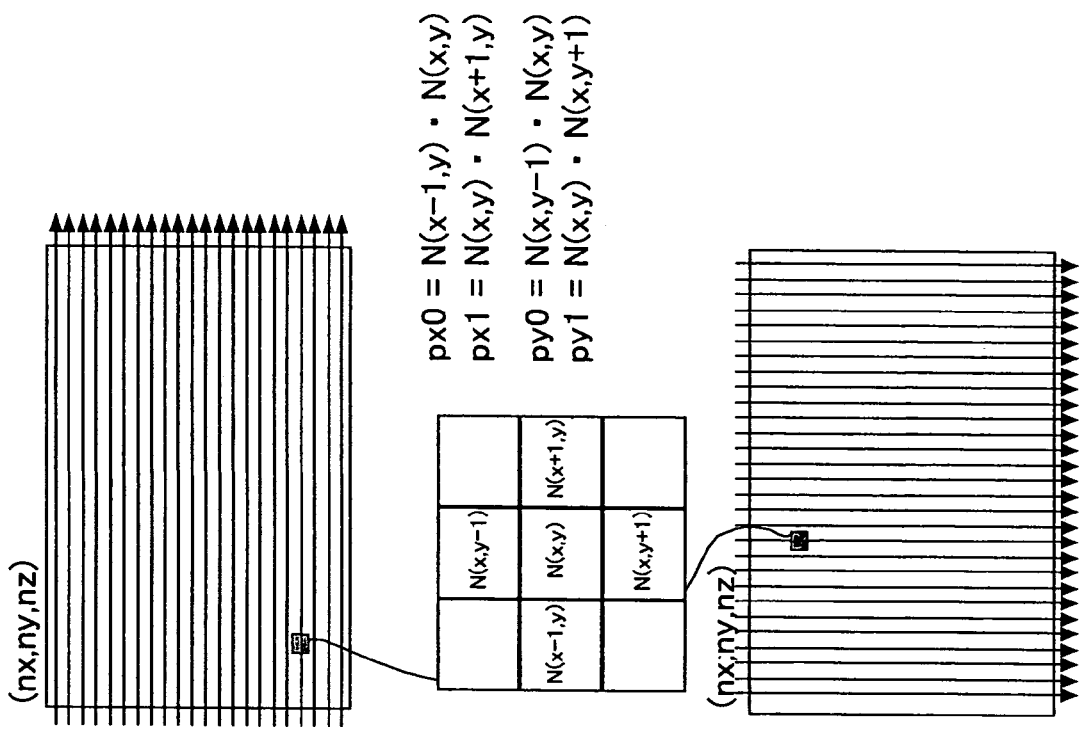
FIG. 5A
FIG. 5B
FIG. 5C
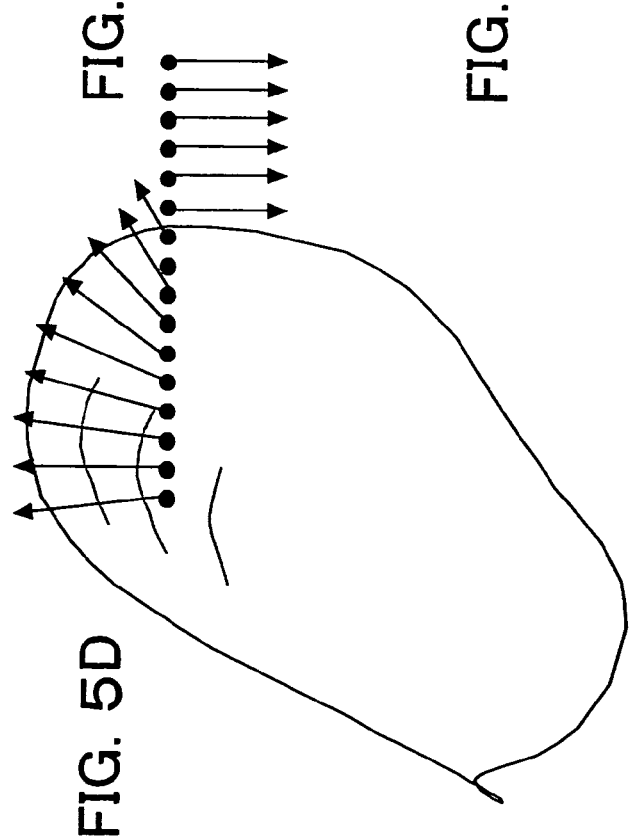
FIG. 5D

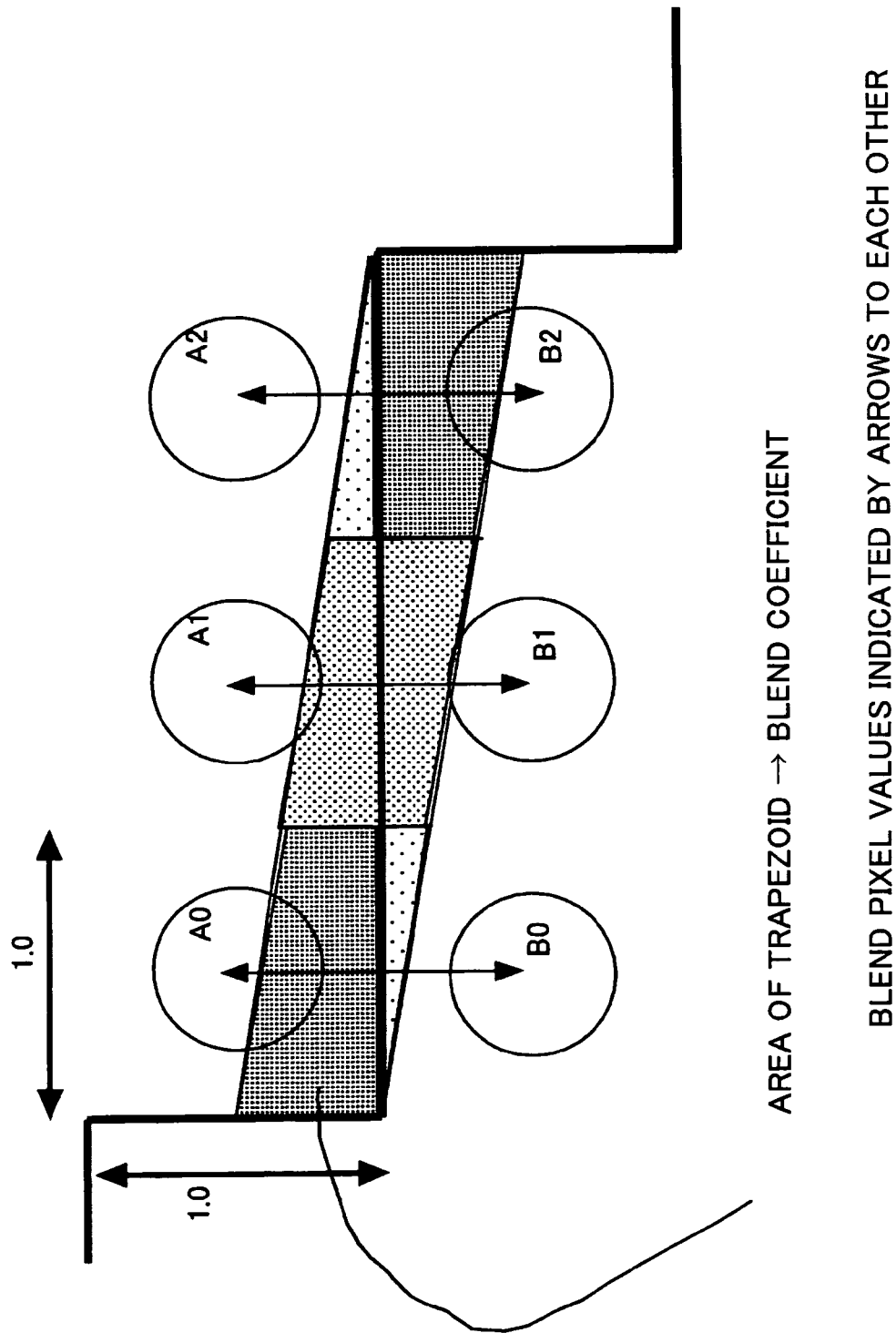

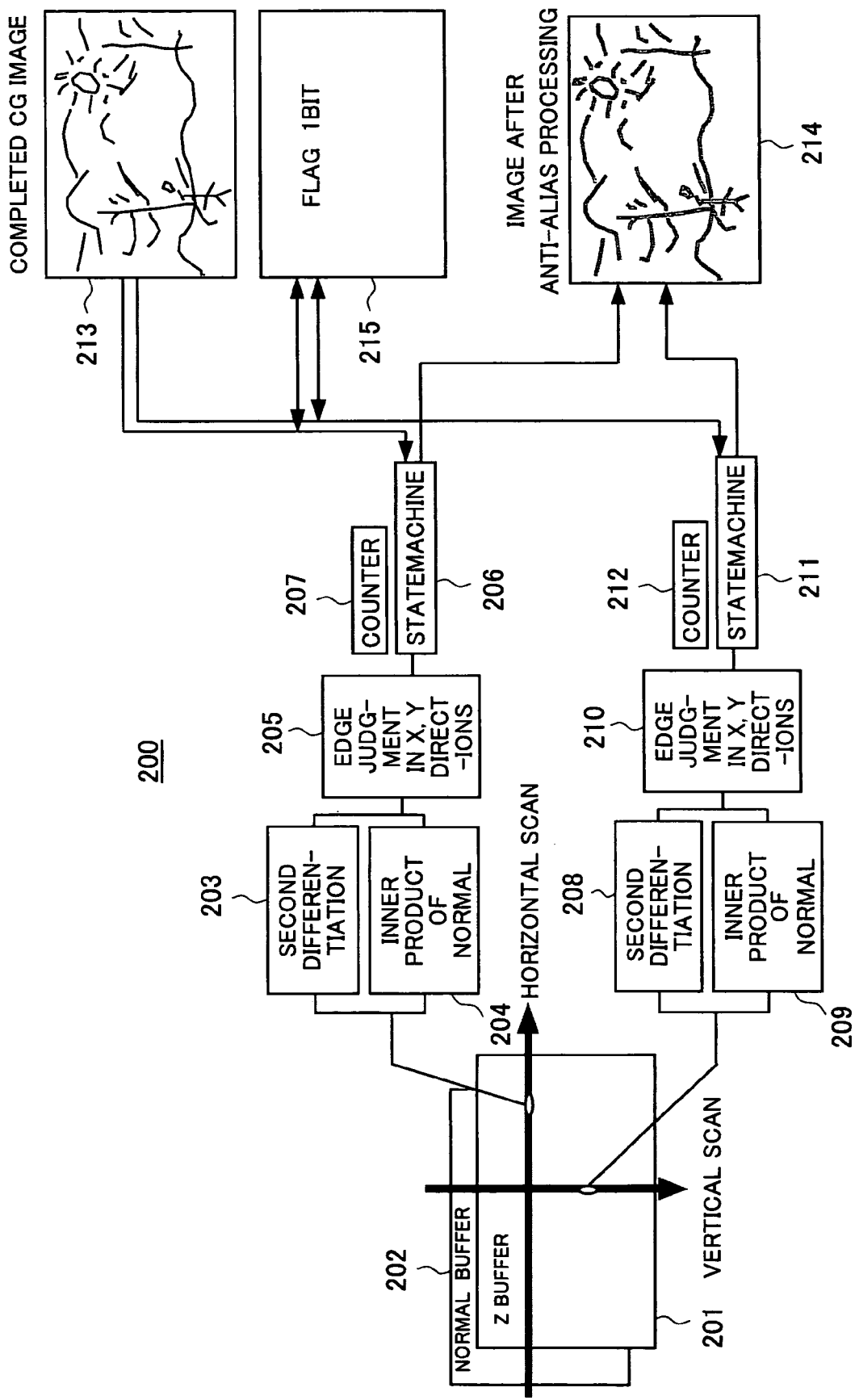

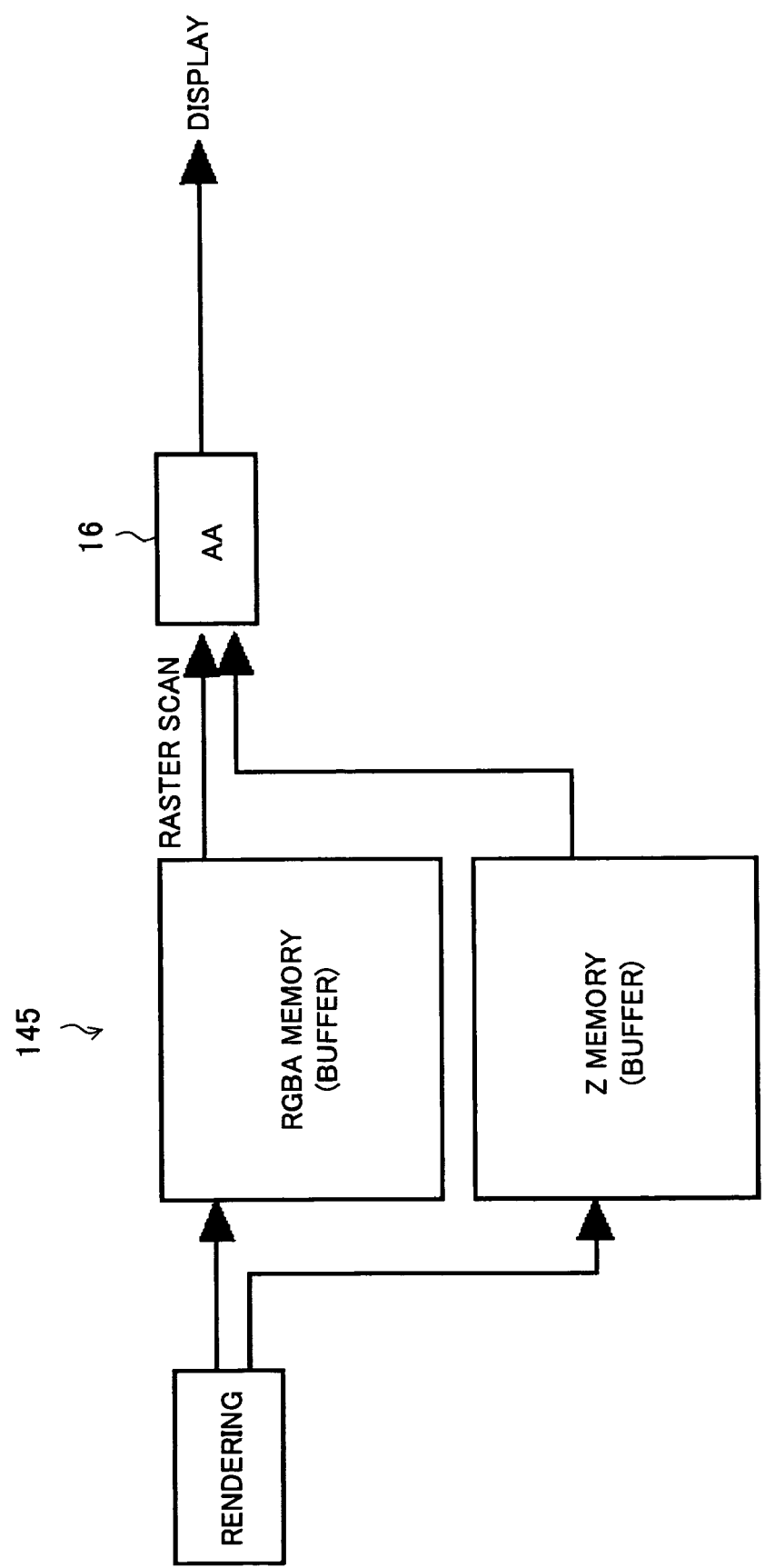

$$s=(sz3+sz1-2*sz2)/(sz4-sz3-sz2+sz1)$$

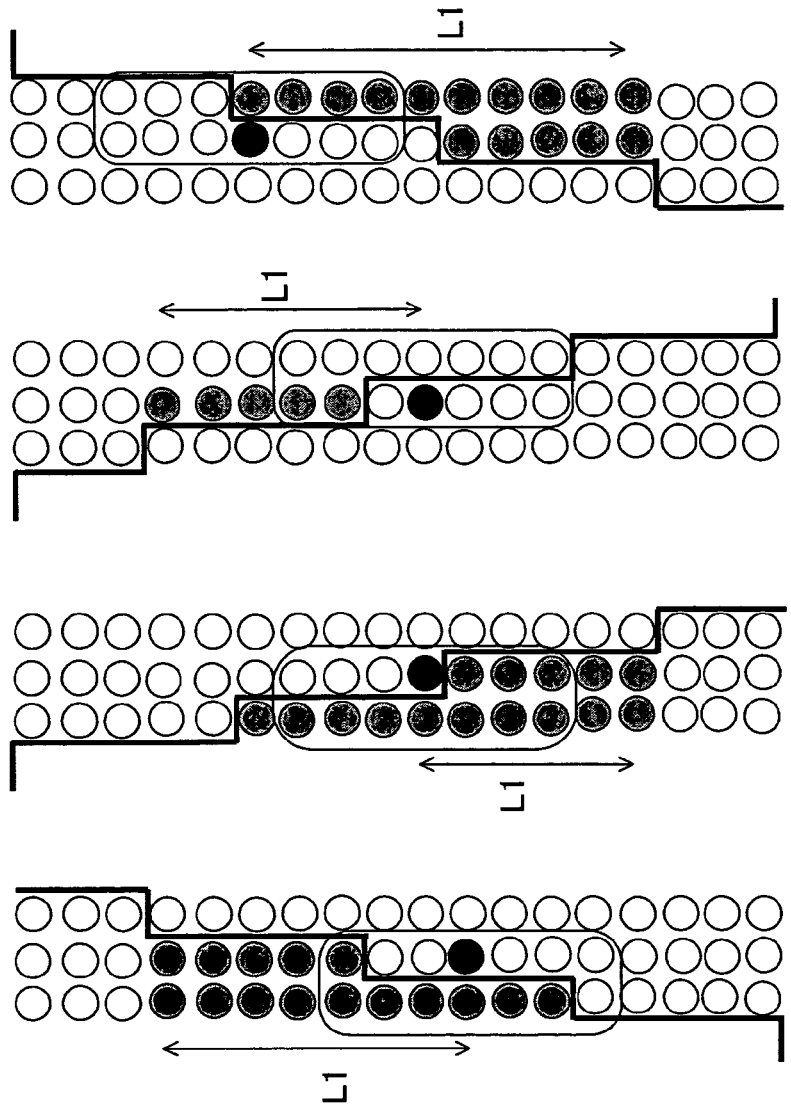

IMAGE PROCESSING APPARATUS AND METHOD OF SAME

BACKGROUND OF THE INVENTION

1. Field of the Invention

The present invention relates to an image processing apparatus which expresses a model by a composite of unit graphics, generates pixel data in a drawing area of a screen coordinate system, performs rendering with respect to a memory, and, when generating an image, generates edge information and performs anti-aliasing and a method of the same.

2. Description of the Related Art

Along with recent improvements of the operating speed in computer systems and the strengthening of drawing functions, "computer graphics (CG)" technology using computer resources to prepare and process graphics and images has been the subject of active research and development and has been put into practical use.

For example, three-dimensional graphics express the optical phenomenon when a three-dimensional object is illuminated by a predetermined light source by a mathematical model, add shading or gradation to the object surface based on this model, and further attach patterns to generate a more realistic and three-dimensional-like two-dimensional high definition image. Such computer graphics have become increasingly used in CAD/CAM in the field of development in science, engineering, and manufacture and other various fields of application.

Three-dimensional graphic processing is generally composed by a "geometry sub-system" positioned as a front end and a "raster sub-system" positioned as a back end.

The "geometry sub-system" means a step of geometric processing of the position, posture, etc. of a three-dimensional object displayed on a display screen. In the geometry sub-system, generally an object is handled as a set of a large number of polygons. The geometric processing such as "coordinate conversion", "clipping", and "light source computation" is carried out in unit of polygons.

On the other hand, the "raster sub-system" means a step of painting pixels forming the object. The rasterization is realized by interpolating image parameters of all pixels included inside a polygon based on for example the image parameters found for each vertex of the polygon. The image parameters referred to here include color (drawing color) data expressed by a so-called RGB format, a z-value for expressing distance in a depth direction. etc. Further, in recent high definition three-dimensional graphic processing, also an f (fog) for fostering a sense of perspective and a texture t for expressing the feeling of the material or pattern of the object surface to impart realism are included as image parameters.

Here, the processing for generating a pixel inside a polygon from the vertex information of the polygon is often executed by using a linear interpolation technology referred to as a "digital differential analyzer" (DDA). In the DDA process, the inclination of data to a side direction of a polygon is found from the vertex information, the data on the side is calculated by using this inclination, the inclination of the raster scanning direction (X-direction) is calculated, and the amount of change of the parameter found from this inclination is added to the parameter value of the starting point of the scanning to thereby generate a pixel inside.

Further, in three-dimensional computer graphics, when deciding the color corresponding to each pixel, rendering is performed for computing the color of each pixel and writing the value of this computed color to an address of a display buffer (frame buffer) corresponding to the pixel.

The image generated by such computer graphics is anti-aliased or otherwise processed in order to raise the visual resolution since an aliasing effect of discontinuity of straight lines, polygonal edges, and boundaries of colors occurs. Extraction of the edge information becomes necessary for the anti-aliasing.

Conventionally, edge extraction methods include the method of extracting edges from a generated picture by just filtering, the method of extracting edges by drawing polygons by outlines, etc. Further, the techniques of anti-aliasing include the super sampling method, the method of finding coverage for every pixel, etc.

Summarizing the problems to be solved by the invention, the method of extracting edges by just filtering does not utilize the advantages of the image being made by three-dimensional computer graphics, that is, useful data is generated etc. at the time of generating the image, so a certain degree of edge information is obtained, but edge information accurate enough to be able to be utilized for the anti-aliasing cannot be obtained.

In the method of extracting edges by drawing polygons by outlines, all of the surrounding edges are drawn in units of polygons, so rendering of pixels other than the inherently necessary drawn pixels, such as the surrounding pixels, is necessary. At that part, a drop in the drawing speed is induced. Further, most of the edges of the rendered polygons are not the edges of the drawn object and are overwritten by other polygons, so become useless.

Further, the super sampling method used as an anti-aliasing technique is a method of drawing a large amount of points and then applying a low pass filter (LPF). In this method, if increasing the number of samples, the quality is improved by that extent, but an enormous memory becomes necessary for that amount. Further, when the number of samples is increased, that number has to be rendered, so a serious reduction is caused in the drawing speed as well.

Further, with the method of finding the coverage for every pixel, the size of the memory which become necessary is smaller compared with the technique of super sampling, but the drawing order has a large effect, so correct anti-aliasing cannot be carried out if the drawing order of the polygons is poor and thus a Z-sort technique becomes necessary. Further, even if Z-sorting, there are the problems that the background persistently remains etc. For example, such problems occur at the center of a triangle fan.

SUMMARY OF THE INVENTION

A first object of the present invention is to provide an image processing apparatus and method making unnecessary rendering of surrounding pixels other than in addition to the inherently necessary drawn pixels and capable of extracting edge information accurate enough to be able to be utilized for anti-aliasing without inducing a drop in the drawing speed.

A second object of the present invention is to provide an image processing apparatus and method capable of realizing accurate anti-aliasing free from the influence of the drawing order and without inducing a drop in the drawing speed.

To attain the above objects, according to a first aspect of the present invention, there is provided an image processing apparatus generating pixel data inside a drawn area of a screen coordinate system to perform rendering with respect to a memory and generate an image drawn in the memory and, at that time, generating edge information and performing anti-aliasing, comprising an edge information extracting means for extracting the edge information based on predetermined pixel data drawn in the memory and an anti-aliasing means for determining the content of processing required for anti-aliasing based on the edge information obtained by the edge information extracting means and executing the determined processing.

Preferably, the anti-aliasing means determines adjoining pixels for blending with pixels on each edge and the blending ratio and performs blending based on the determined pixels and ratio.

Preferably, the anti-aliasing means includes a first means for detecting at which position of what shape of aliasing pattern a pixel being processed is at from the edge information and a second means for measuring a length from a start point of the detected aliasing pattern to the change point where the edge reverses and a length from the change point to where the aliasing pattern ends and calculating a position of a pixel to be blended with and a coefficient of blending based on information obtained from the first means and second means.

Preferably, the pixel data drawn in the memory includes depth information, and the edge information extracting means finds a second differentiation of the depth information obtained as a result of scanning a depth information buffer of the memory storing the depth information and extracts edge information based on the second differentiation.

Preferably, the data generated at the time of drawing to the memory includes a normal vector for every pixel, a normal vector buffer storing the normal vectors is formed in the memory, and the edge information extracting means extracts the edge information based on normal vectors obtained as a result of scanning the normal vectors for the pixels stored in the normal vector buffer.

Preferably, the pixel data drawn in the memory includes depth information, and the edge information extracting means restores the normal vector for each pixel from the depth information obtained as a result of scanning the depth information buffer of the memory storing the depth information and the screen coordinates and extracts the edge information based on the restored normal vectors.

Preferably, the edge information extracting means extracts edge information of a plurality of lines near a line being examined.

According to a second aspect of the present invention, there is provided an image processing method generating pixel data in a drawn area of a screen coordinate system to perform rendering with respect to a memory and generate an image drawn in the memory and, at that time, generating edge information and performing anti-aliasing, comprising a first step of extracting the edge information based on predetermined pixel data drawn in the memory and a second step of determining the content of processing required for anti-aliasing based on the edge information obtained at the first step and executing the determined processing.

According to the present invention, after the depth information finishes being drawn in the memory by the edge information extracting means, a depth information buffer is scanned, and a second differentiation of the depth information obtained by scanning.

Then, it is evaluated whether or not a pixel is at an edge by comparing a set threshold value and the found second differentiation.

Namely, according to the present invention, the edge information is extracted after for example drawing by utilizing information which is originally necessary at the time of ordinary drawing of three-dimensional computer graphics and remains as information when drawn, but is conventionally unused after that, for example, the information of the depth (z) buffer.

Further, according to the present invention, information which does not remain in the ordinary drawing of three-dimensional computer graphics, for example, the information of the normal vector for each pixel, is kept and used in later stages, or information necessary for the extraction of the edge at later stages is formed at the time of drawing and kept.

Further, at the anti-aliasing means, the value of which pixel adjoining each pixel on the edge in which direction and the blending ratio are determined and blending is performed by the determined value.

BRIEF DESCRIPTION OF THE DRAWINGS

These and other objects and features of the present invention will become clearer from the following description of the preferred embodiments given with reference to the accompanying drawings, in which:

FIG. 1 is a view of the system configuration of a three-dimensional computer graphic system forming an image processing apparatus according to the present invention;

FIGS. 3A to 3C are views for explaining a scanning operation of a z-buffer according to the present embodiment;

FIGS. 5A to 5D are views for explaining a method of using a normal vector according to the present embodiment;

FIG. 7 is a view for explaining a blending operation in the anti-aliasing according to the present embodiment;

FIG. 12 is a view for conceptually showing an example of the configuration of an anti-aliasing system according to the present embodiment;

FIG. 15 is a view showing a case of raster scanning for displaying the RGB image as a result of rendering on a display and, in parallel and in synchronization with this, also scanning a z-buffer and, at the time of transfer to the display, changing the image on the memory and transferring it to the display after the end;

FIGS. 17A to 17D are views for explaining edge extraction of a case of a boundary between an object and a background.

DESCRIPTION OF THE PREFERRED EMBODIMENTS

Figure 2B:
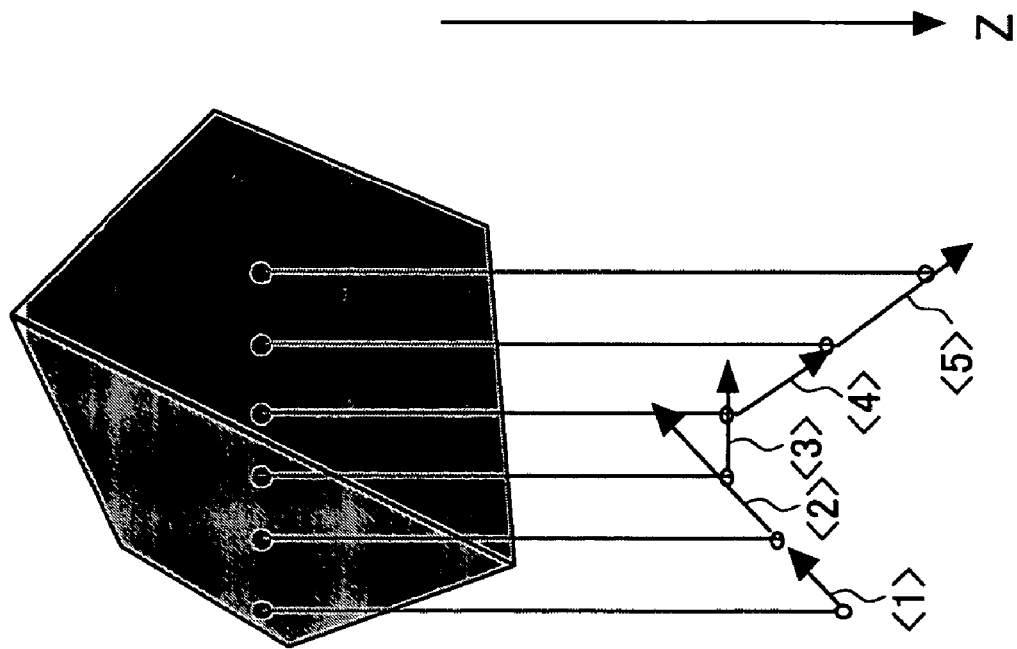
FIGS. 2A and 2B are views for explaining second differentiation of a z-value according to the present embodiment.

Below, in the present embodiment, an explanation will be given of a three-dimensional computer graphic system, as applied to a personal computer etc., for displaying a desired three-dimensional image for any object model on a cathode ray tube (CRT) or other display at a high speed.

FIG. 1 is a view of the system configuration of a three-dimensional computer graphic system 10 forming an image processing apparatus according to the present invention.

The three-dimensional computer graphic system 10 is a system for expressing a three-dimensional model as a composite of triangles (polygons) serving as unit graphics, drawing these polygons to decide the color of each pixel of the display screen, and displaying the result on a display, that is, for polygon rendering.

Further, the three-dimensional computer graphic system 10 uses, other to the (x, y) coordinates for expressing the position on a plane, a z-coordinate expressing the depth, so as to express a three-dimensional object and specifies any point in a three-dimensional space by the three (x, y, z) coordinates.

Further, the three-dimensional computer graphic system 10 performs image processing such as anti-aliasing on the image generated by the computer graphics. In this case, a large amount of useful information which cannot be utilized when ordinarily processing an image is generated in the step of generation of the computer graphics (CG) image. In the present embodiment, a method of reusing or processing this useful information to accurately extract edge information indicating a surface on which a boundary or direction of an object in the image sharply changes is shown.

The present embodiment includes two types of methods. Details will be explained later.

The first method is the method of utilizing information which is originally necessary at the time of ordinary drawing of three-dimensional computer graphics and remains as information when drawn, but conventionally is not used after that, for example, the information of the z-buffer, to extracting edge information after the drawing. The information of the z-buffer is drawn by the three-dimensional computer graphics together with the color information, but conventionally while the color information is passed to the later stages for use, the z-information (z-value) is discarded without use after that. In the present embodiment, the information of the z-buffer is reused in the later stages.

The second method is the method of keeping information which does not remain in ordinary drawing of three-dimensional computer graphics, for example information of the normal vector for every pixel and information of the inclination of the polygons, and using it in the later stages or the method of forming the information necessary for the edge extraction in the later stages and keeping the same. This method can be interpreted also as rendering an "instruction" or an "operation code" in the sense of indicating what should be done to later stages. The information is the information peculiar to three-dimensional computer graphics. It can also be said to be a technique for effectively processing and passing on to the later stages the information provided at the time of the drawing so that it can be used in the image processing of the latter stages.

In the method of using a z-buffer, the second differentiation is calculated in units of pixels and used for the edge extraction.

In the method of using normal vectors, the inner products of the normal vectors of adjacent pixels are computed in units of pixels, and it is judged if a pixel is at an edge from the magnitude thereof.

Further, a method of restoring the information of the normal vector in each pixel by using the screen coordinates of the pixel from only the information of the z-buffer and using the same can be employed.

Further, also a method of using a technique such as super sampling for only the edge portion found by this technique can be employed.

Further, the three-dimensional computer graphic system 10 does not calculate and store the coverage of each pixel at the time of drawing unlike the generally used technique when performing the anti-aliasing. It does not use a technique such as multi-sampling and super sampling either.

Namely, the three-dimensional computer graphic system 10 performs the anti-aliasing as post-processing after the end of the generation of the computer graphics image.

The edge is extracted as post-processing after the end of the generation of the computer graphics image, and the anti-aliasing is carried out by utilizing the edge information.

The pattern of the edge is derived from the edge information, and the pixels are processed in accordance with the pattern. In the present embodiment, not only are the pixels surrounding the written pixel blended with, but also both of the object and the background are blended with. Even pixels written as 100% in terms of coverage are sometimes blended.

At the time of pattern extraction, a linear long edge can be handled by using a state machine and a counter.

As the pattern of the edge, only patterns needing anti-aliasing are handled. Also, patterns having overlapped edges are handled.

In the present embodiment, a mounting method for scanning information of the z-buffer etc. in units of pixels and simultaneously proceeding with the anti-aliasing is also shown.

The necessary processings are as follows:

1) Restoration of edge information for the x-direction and y-direction in the screen coordinates from the image after the drawing.

2) Determination of the processing content necessary for the anti-aliasing from the obtained edge information.

3) Performance of the determined processing.

In the present embodiment, the technique of applying the anti-aliasing to pixels by scanning either of the information of the z-buffer obtained at the time of the drawing or the information of the normal vector in each pixel or the information of both or by using the information of the normal vectors restored from the information of the z-buffer is employed.

In each scan, a state machine as a first means for holding the state and a counter as a second means for measuring continuity of the edge is prescribed. Using these two devices, it is decided by which ratio to blend a pixel on each edge with the pixel value of the pixel adjacent in which direction.

Then, the decided value is used for the blending. This is successively performed during the scan until the pixel value is updated.

According to this method, the amount of the memory increased for the purpose of the anti-aliasing can be kept small, and no processing lowering performance at the time of the drawing is added.

Below, the specific configurations and functions of the parts of the three-dimensional computer graphic system 10 configured as described above will be successively explained.

As shown in FIG. 1, the three-dimensional computer graphic system 10 is comprised of a main processor 11, a main memory 12, an I/O interface circuit 13, and a rendering circuit 14 connected via a main bus 15. The rendering circuit 14 is connected to a CRT control circuit 16. Note that, in FIG. 1, the CRT control circuit 16 is provided outside the rendering circuit 14, but a configuration providing the same in the rendering circuit 14 can also be employed.

Among these components, the rendering circuit 14 and/or CRT control circuit 16 constitute the edge information extracting means and the anti-aliasing means of the present invention.

Below, an explanation will be given of the functions of the components.

The main processor 11 reads out necessary graphic data from the main memory 12 in accordance with a state of progress etc. of the application and performs geometry processing etc. such as coordinate conversion, clipping, and lighting with respect to this graphic data to generate polygon rendering data.

The main processor 11 outputs the polygon rendering data S11 to the rendering circuit 14 via the main bus 15.

The I/O interface circuit 13 receives as input control information of motion or polygon rendering data etc. from the outside in accordance with need and outputs this to the rendering circuit 14 via the main bus 15.

The polygon rendering data input to the rendering circuit 14 includes data of (x, y, z, R, G, B α, s, t, q) of three vertexes of each polygon.

Here, (x, y, z) data shows the three-dimensional coordinates of the vertexes of the polygon, and (R, G, B) data shows luminance values of red, green, and blue at the three-dimensional coordinates.

Further, α shows a blending value (coefficient)

Among (s, t, q) data, (s, t) show homogeneous coordinates of a corresponding texture, and q shows a homogeneous term. Here, "s/q" and "t/q" are multiplied with texture sizes USIZE and VSIZE to obtain actual texture coordinate data (u, v).

Access to texture data stored in a graphic memory of the rendering circuit 14 (specifically a texture buffer described later) is carried out by using texture coordinate data (u, v).

Namely, the polygon rendering data is physical coordinate values of vertexes of a triangle and colors of vertexes and texture data.

The rendering circuit 14 has, as shown in FIG. 1, a digital differential analyzer (DDA) set-up circuit 141 as an initial set-up operation block for a linear interpolation operation, a triangle DDA circuit 142 as a linear interpolation processing block, a texture engine circuit 143, a memory interface (I/F) circuit 144, and a graphic memory 145 configured by for example a DRAM. A processing circuit is configured by the texture engine circuit 143 and the memory interface (I/F) circuit 144.

Before linearly interpolating values of vertexes of a triangle on the physical coordinate system to find color imformation and depth information of each pixel inside the triangle in the later triangle DDA circuit 142, the DDA set-up circuit 141 finds a difference etc. between a side of the triangle and a horizontal direction for (z, R, G, B, α, s, t, q) data indicated by the polygon rendering data S11, that is, for a set-up operation.

This set-up operation specifically calculates an amount of change of a value to be found in a case of a unit length movement by using the value of the start point, the value of the end point, and the distance between the start point and the end point.

The DDA set-up circuit 141 outputs set-up data S141 as information concerning a primitive, including the calculated change data, to the triangle DDA circuit 142.

Each set of vertex data of a triangle is comprised of 16 bits of for example x- and y-coordinates, 24 bits of the z-coordinate, 12 bits (=8+4) of the RGB color values, and 32 bits of floating decimal values (IEEE format) of the s, t, q texture coordinates.

The triangle DDA circuit 142 calculates the linearly interpolated (z, R, G, B, α, s, t, q) data at pixels inside the triangle based on the set-up data S141 as the information concerning the primitive including the change data input from the DDA set-up circuit 141.

The triangle DDA circuit 142 outputs the (x, y) data of each pixel and the (z, R, G, B, α, s, t, q) data at the (x, y) coordinates as DDA data (interpolation data) S142 to the texture engine circuit 143.

Namely, the triangle DDA circuit 142 interpolates the image parameters of all pixels included inside a polygon based on the image parameters found for every vertex of the polygon, that is, for rasterization.

Specifically, the triangle DDA circuit 142 rasterizes various types of data (z, texture coordinate, color etc.).

The texture engine circuit 143 performs processing for calculation of "s/q" and "t/q", processing for calculation of the texture coordinate data (u, v), reading of the (R, G, B) data from the graphic memory 145, etc. in a pipeline format.

Note that, the texture engine circuit 143 simultaneously performs the processing for a plurality of (for example four or eight) pixels positioned within for example a predetermined rectangle in parallel.

The texture engine circuit 143 performs an operation for dividing the s data by the q data and dividing the t data by the q data for the (s, t, q) data indicated by the DDA data S142.

The texture engine circuit 143 is provided with for example not shown a number of division circuits corresponding to the number (for example 8) of pixels to be processed in parallel. The divisions "s/q" and "t/q" for eight pixels are simultaneously carried out. Further, it is also possible to mount the circuit so as to perform the interpolation operation from a representative point among the 8 pixels.

Further, the texture engine circuit 143 multiplies the division results "s/q" and "t/q" with texture sizes USIZE and VSIZE to generate the texture coordinate data (u, v).

Further, the texture engine circuit 143 outputs a read request including the generated texture coordinate data (u, v) to the graphic memory 145 via the memory I/F circuit and reads out the texture data stored in the texture buffer included in the graphic memory 145 via the memory I/F circuit to thereby obtain the (R, G, B) data stored at the texture address corresponding to the (s, t) data.

The texture engine circuit 143 generates the pixel data by multiplying etc. the (R, G, B) data of the read out (R, G, B)

data and the (R, G, B) data included in the DDA data S142 from the former triangle DDA circuit 142 to generate the pixel data.

The texture engine circuit 143 finally outputs this pixel data as the color value of the pixel to the memory I/F circuit 144.

Note that the texture buffer included in the graphic memory 145 stores MIPMAP (texture for a plurality of resolutions) or other texture data corresponding to a plurality of compression rates. Here, which compression rate texture data to use is determined at the above triangular units using a predetermined algorithm.

The texture engine circuit 143 directly uses the (R, G, B) data read out from the texture buffer in the case of a full color mode.

On the other hand, in a case of an index color mode, the texture engine circuit 143 transfers the data of a color index table prepared in advance from a texture color look-up table (CLUT) buffer to a temporary storage buffer configured by a built-in SRAM etc. and obtains the (R, G, B) corresponding to the color index read out from the texture buffer by using this color look-up table.

For example, when the color look-up table is comprised of an SRAM, when the color index is input to the address of the SRAM, the actual (R, G, B) data comes out in the output.

Further, the texture engine circuit 143 can be configured so as to store information which does not remain in ordinary drawing of three-dimensional computer graphics, for example, information of the normal vector for every pixel and information of the inclination of the polygon in the graphic memory 145 for realizing the second method of edge information extraction explained above.

The memory I/F circuit 144 compares the z-data corresponding to the pixel data S145 input from the texture engine circuit 143 and the z-data stored in the z-buffer included in the graphic memory 145, judges whether or not the image drawn by the input pixel data is positioned closer (to the viewing point side) than the image written to the graphic memory 145 (display buffer) the previous time, and updates the z-data to the image data and stored in the z-buffer when it is positioned closer.

Further, the memory I/F circuit 144 writes the (R, G, B) data to the graphic memory 145 (display buffer).

Further, the memory I/F circuit 144 calculates the memory block of the graphic memory 145 storing the texture data corresponding to the texture address at the pixel to be drawn from then on from the texture address, issues a read request to only that memory block, and thereby read out the texture data.

In this case, a memory block not retaining the corresponding texture data is not accessed for reading the texture data, so it becomes possible to provide more access time for drawing.

In the same way at the time of drawing, the memory I/F circuit 144 reads out the pixel data from the corresponding address for modify writing of the memory block of the graphic memory 145 storing the pixel data corresponding to the pixel address to which the data is to be drawn from then on and writes back the data to the same address after the modification.

At the time of hidden plane processing, the circuit reads out the depth data from the corresponding address for modify writing of the memory block storing the depth data corresponding to the pixel address to which the data is still be drawn as well and, if necessary, writes back the data to the same address after the modification.

Further, the memory I/F circuit 144, when receiving the read request including the generated texture coordinate data (u, v) with respect to the graphic memory 145 from the texture engine circuit 143, reads out the (R, G, B) data stored in the graphic memory 145.

Further, when receiving a request for reading the display data from the CRT control circuit 16, the memory I/F circuit 144 reads out a certain amount of the display data, for example a unit of 8 pixels or 16 pixels, from the graphic memory 145 (display buffer) in response to this request.

When receiving a read request of the z-value from the CRT control circuit 16 for example for edge information restoration using for example the z-value, the memory I/F circuit 144 scans the graphic memory 145 (z-buffer) in the x-direction (horizontal direction) and the y-direction (vertical direction) to read out the z-value in response to this request.

Further, when receiving a read request of a normal vector for edge information restoration using for example the normal vector from the CRT control circuit 16, the memory I/F circuit 144 scans the graphic memory 145 to read out the normal vector information in response to this request.

The memory I/F circuit 144 accesses (for writing or reading) the graphic memory 145, but the write path and read path are configured as separate paths.

Namely, in the case of writing, the write address and the write data are processed in a write system circuit and written to the graphic memory 145, while in the case of reading, they are processed in a read system circuit and read out from the graphic memory 145.

Further, the memory I/F circuit 144 accesses the graphic memory 145 in units of for example 16 pixels based on a predetermined interleave type of addressing.

In such transfer of data with the memory, the drawing performance can be improved by performing a number of the processings in parallel.

Especially, simultaneous calculation is carried out for a plurality of pixels by providing the same circuit for the triangle DDA portion and the texture engine portion in a parallel valid format (space parallel) or finely inserting pipelines (time parallel).

The memory blocks of the graphic memory 145 are arranged so that adjacent portions in the display region become different memory blocks as will be explained later, so when drawing a plane like a triangle, they become able to be simultaneously processed on the plane. Thus, the operation probability of each memory block becomes very high.

The graphic memory 145 basically functions as the texture buffer, display buffer, z-buffer, and texture CLUT (Color Look Up Table) buffer.

Further, when the CRT control circuit 16 is configured so as to perform the edge information restoration using normal vectors, the graphic memory 145 functions also as a normal buffer for storing the normal vectors in addition to the functions as a texture buffer, display buffer, and z-buffer and the texture CLUT (Color Look Up Table) buffer.

The graphic memory 145 is divided into a plurality of, for example four, modules having the same function.

For storing more texture data in the graphic memory 145, indexes at the index colors and the color look-up table values for the same are stored in the texture CLUT buffer.

The indexes and color look-up table values are used for the texture processing as explained above.

Namely, a texture element is normally expressed by a total 24 bits comprised of the 8 bits of each of R, G, and B. With this, however, the amount of data swells, so one color is selected from for example 256 colors selected in advance and that data is used for the texture processing. As a result, with 256 colors, a texture element can be expressed by 8 bits. A conversion table from the indexes to the actual colors becomes necessary, but the higher the resolution of the texture, the more compact the texture data can become.

Due to this, compression of the texture data becomes possible and efficient utilization of the built-in memory becomes possible.

Further, the graphic memory 145 stores the depth information of the object to be drawn for performing the hidden plane processing simultaneously and in parallel with the drawing.

Note that, as the storage method of the display data, the depth data, and the texture data, for example, the display data is stored at a predetermined position in the memory block, for example continuously stored from the top, then the depth data is stored and then the texture data is stored in continuous address spaces for every type of the texture in the remaining vacant region.

As described above, after the predetermined processings in the DDA set-up circuit 141, the triangle DDA circuit 142, the texture engine circuit 143, the memory I/F circuit 144, etc., the final memory access becomes the drawing pixel unit such as a pixel.

The CRT control circuit 16 generates a display address for display on a not shown CRT in synchronization with given horizontal and vertical synchronization signals and outputs a request for reading the display data from the display buffer included in the graphic memory 145 to the memory I/F circuit 144.

In response to this request, the memory I/F circuit 144 reads out a certain amount of the display data from the graphic memory 145 (display buffer).

The CRT control circuit 16 includes for example a built-in FIFO circuit for storing the display data read out from the graphic memory 145 and generates the index value of RGB at constant time intervals.

The CRT control circuit 16 stores the R, G, B data corresponding to the index values and transfers the R, G, B data of a digital format corresponding to the index values of generated RGB to a not illustrated digital/analog (D/A) converter to generate the R, G, B data of an analog format.

The CRT control circuit 16 outputs this generated R, G, B data to a not shown CRT.

The CRT control circuit 16 performs anti-aliasing and other the image processing with respect to the image generated by the computer graphics processing described above.

Below, an explanation will be given of the processing for edge information generation for the anti-aliasing in the present embodiment and the specific anti-aliasing based on the generated edge information in relation to the drawings.

First, an explanation will be given of the processing for generation of information for the edge extraction.

In the present embodiment, as the information generation method for the edge extraction, as explained above, the first method of reusing the z-value of the z-buffer and the second method of using the information of the normal vector for every pixel are employed.

Edge Extraction Method Utilizing Information of Z-Buffer

The z-value is originally calculated and written in the graphic memory 145 at the time of drawing of the three-dimensional computer graphics. Here, the z-value itself is not used. Rather, second differentiation of the z-value becomes necessary.

Figure 2A:
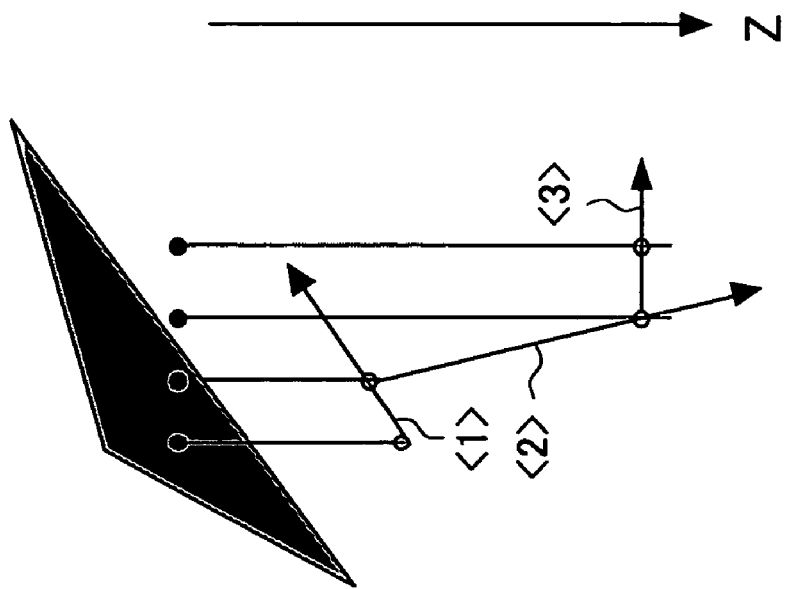

As shown in FIGS. 2A and 2B, the second differentiation of the z-value is very useful information. A point where that value is off from the suitable threshold value can be regarded as an edge. Not the z-value calculated from the two-dimensional image by image recognition, but the value of the accurate z is learned at the time of drawing the three-dimensional computer graphics, so the precision of the edge information detected from the second differentiation of z-value becomes extremely high. The edge obtained here is the boundary between the drawn object and the background in many cases.

In FIG. 2A, at two points sandwiching the edge, the result (direction) of the second differentiation indicated by an arrow <2> in the drawing is very different from the results (directions) indicated by arrows <1> and <3> in the view inside the same object or at the background. In the same way, in FIG. 2B, at two points sandwiching the edge, the result of the second differentiation indicated by the arrow <3> in the view is very different from the results (directions) indicated by arrows <1>, <2>, <4>, and <5> in the view inside the same object or background.

As the method of obtaining the second differentiation of z, a method of calculation by scanning the z-buffer after the end of drawing and a method of updating the second differentiation of z at the same timing as the writing (installation) of the pixel value at the time of the drawing can be employed.

When it is necessary to conserve the memory, preferably the method of using the former method and ending the necessary processing simultaneously with the scanning of z in accordance with the request of the CRT control circuit 16 is adopted.

If it is necessary to lighten the processing at the later stages, the latter method can be used to terminate the calculation of the second differentiation of z together with the drawing.

Here, an explanation will be given of the method of terminating the calculation of the second differentiation of z together with the drawing. In this case, not the CRT control circuit 16, but the memory I/F circuit 144 or texture engine circuit 143 is used to calculate the second differentiation of z together with the drawing. The CRT control circuit 16 reads out the second differentiation concerning the generated image through the memory I/F circuit 144 and performs the anti-aliasing.

A buffer of the second differentiations of z is provided other than the originally existing z-buffer and is initialized to 0. Whenever the z-value of a certain pixel is updated at the time of the drawing, the second differentiations of the surrounding pixels having z-values exerting an influence upon the second differentiation are updated.

By that process, the buffer of the second differentiations of z is formed at the time of the end of drawing.

When the screen coordinates are x and y and the z-value at each pixel is z(x, y), as the distribution of the second differentiations, the following two distributions become necessary for each pixel.

$$d2z/dx2(x,y)=z(x+1,y)+z(x-1,y)-2*z(x,y)$$

$$d2z/dy2(x,y)=z(x,y+1)+z(x,y-1)-2*z(x,y) \quad (1)$$

At the time of drawing, if the z-value of a certain x, y address is updated, the second differentiations of z of the addresses (x−1,y), (x+1,y), (x,y−1), (x,y+1), and (x,y) are updated.

For example, assume that the second differentiation before update is as follows:

$$d2z/dx20\_0(x,y)=z0(x+1,y)+z0(x-1,y)-2*z0(x,y) \quad (2)$$

Here, assuming that the z-value of for example (x−1, y) is updated to z1, the second differentiation after update becomes as follows:

$$d2z/dx21\_1(x,y)=z0(x+1,y)+z1(x-1,y)-2*z0(x,y) \quad (3)$$

At this time, in order to update the second differentiations, the calculation of the following equation may be carried out:

$$d2z/dx2\_1-d2z/dx2\_0=z1(x-1,y)-z0(x-1,y) \quad (4)$$

Updating can be performed by a read modify write procedure of reading the value of d2z/dx20_, adding the above difference, and writing the result back.

Note that, when using the second differentiation of z for processing such as anti-aliasing, a method of using either of the values in x- and y-directions or a method of independently using the two information can be employed.

Next, as the method of obtaining the second differentiation of z, an explanation will be given of a method of scanning the z-buffer after the end of drawing, calculating, and generating edge information.

FIGS. 3A to 3C are views for explaining the method of scanning the z-buffer after the end of drawing and calculation to generate edge information as the method of obtaining the second differentiation of z.

As shown in FIGS. 3A to 3C, when scanning the z-buffer, both of a scan in the horizontal direction (x-direction) and a scan in the vertical direction (y-direction) are effective for restoring the edge information, but it is also effective to make joint use of scans in both the vertical and horizontal directions in the anti-aliasing.

At the time of the scanning, the following filtering is performed at each pixel.

$$d2z=4*z(x,y)-z(x,y-1)-z(x,y+1)-z(x-1,y)-z(x+1,y)$$

$$d2zdx=2*z(x,y)-z(x-1,y)-z(x+1,y)$$

$$d2zdy=2*z(x,y)-z(x,y-1)-z(x,y+1) \quad (5)$$

There is a method of finding the value by adding the up, down, left, right, and center pixels by the coefficients shown in equation 5, but it is also possible to separately find the two values of the value in the vertical direction by the up, down, and center pixels and the value in the horizontal direction by the left, right, and center pixels other than that. This method is effective in the later anti-aliasing.

In the method of separately calculating filtering values (second differentiations of z) in the horizontal direction (x-direction) and vertical direction (y-direction), two values [d2dx,(x,y)] and [dz2dy(x,y)] are found for each pixel at the time of the scanning. The following evaluation using a threshold value Zth is carried out with respect to each value, that is, it is evaluated if an absolute value is larger than the threshold value Zth.

$$abs(dz2dx(x,y))>zth$$

$$abs(dz2dy(x,y))>zth \quad (6)$$

Note that Zth is an adjustable threshold value.

If the evaluation inequality (6) is true, the pixel is at the edge in that direction, and if it is not true, the pixel is not at the edge in that direction.

For example, assume that the second differentiation of z (value at x,y when a distance between screen coordinate pixels is 1) is as in equation 7.

$$x\text{-direction } d2zdx=z(x+1,y)+z(x-1,y)-2*z(x,y)$$

$$y\text{-direction } d2zdy=z(x,y+1)+z(x,y-1)-2*z(x,y) \quad (7)$$

In this case, when d2zdx>zth, it is evaluated that the pixel is on an edge discontinuous in the x-direction but extending in the y-direction.

When d2zdy>zth, it is evaluated that the pixel is on an edge discontinuous in the y-direction and extending in the x-direction.

The above processing can be made for each pixel by one scan of the z-buffer.

Further, independently judging if a certain pixel is at the edge in the x-direction and y-direction is an effective means for the anti-aliasing.

Next, an explanation will be given of the method of using normal vectors for the edge extraction.

Edge Extraction Method Utilizing Information of Normal Vector for Every Pixel

Normal vectors are generated at the time of drawing, but are not ordinarily stored in the graphic memory 145 and are discarded after use. If storing them in the graphic memory 145 for every pixel, they can be used for the edge extraction in the later stages. The extraction method will be explained later.

On the other hand, memory is necessary for storing the normal vectors, so the method of conserving memory by not storing the normal vectors in the memory, but restoring the normal vectors from the screen coordinates and the z-values of the z-buffer after the end of drawing can also be used.

Figure 4:
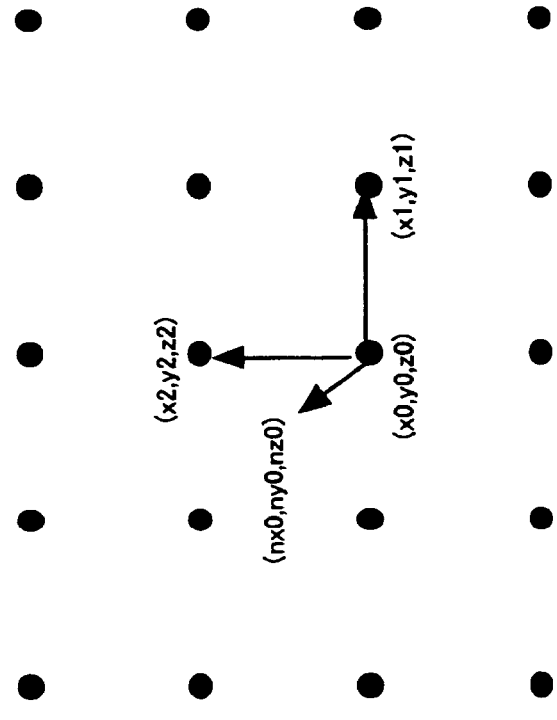
FIG. 4 is a view for explaining a method of restoring a normal vector by using the z-value according to the present embodiment.

As a specific technique, as shown in FIG. 4 and the following equation 8, at each pixel, when the three-dimensional coordinates are formed by the x, y coordinate values of the screen coordinates and the z-value of the z-buffer, and an outer product of vectors is calculated by using the three-dimensional coordinates of three points of a pixel above or below the pixel concerned, a pixel at the right or left to the pixel concerned, and the pixel concerned, the result is a normal vector.

$$(nx0,ny0,nz0)=((x2,y2,z2)-(x0,y0,z0))\times((x1,y1,z1)-(x0,y0,z0))$$

$$nx0=(y2-y0)*(z1-z0)-(z2-z0)*(y1-y0)$$

$$ny0=(z2-z0)*(x1-x0)-(x2-x0)*(z1-z0)$$

$$nz0=(x2-x0)*(y1-y0)-(y2-y0)*(x1-x0) \quad (8)$$

Namely, in the method of restoring a normal from the value of the z-buffer, the vector obtained by normalizing the outer product of a vector from a certain point to two other points in a three-dimensional space formed by the three parameters of the value z of the z-buffer and the address (x, y) of the z-buffer is defined as a normal vector.

Giving one example, when the address of the z-buffer is spread on the two x- and y-dimensions and the distances in the x- and y-directions between pixels are 1, the result becomes as follows:

$$nx=z(x+1,y)-z(x,y)$$

$$ny=z(x,y+1)-z(x,y)$$

$$nz=-1 \quad (9)$$

In this way, for the edge information restoration using the normal vector, it is necessary to store the component of the normal vector of each pixel in the buffer at the time of drawing or restore the normal vector from the information of the z-buffer and the screen coordinate.

If storing normal vectors, the precision is raised if storing the value of the linearly interpolated normal vectors for Phong shading, but it is also possible to store a mean value of the polygon as the value at each pixel at the time of drawing not interpolating the normal vectors.

Further, it is not necessary to store all three components. If it is a condition of the normal vector that the magnitude of the vector is 1, if only the signs of two components and the remaining one component are stored, three components can be extracted later by computation.

FIGS. 5A to 5D show the method of extracting edge information from information of normal vectors.

As shown in the drawing, the information is extracted by the scanning either of the horizontal direction (x-direction) or the vertical direction (y-direction) or both. When there is a normal vector buffer, this normal vector buffer is scanned.

When restoring a normal vector, the z-buffer is scanned and the normal vector is restored while judging edges. During the scanning, at each pixel, the inner products between the normal vector of the center pixel and the normal vectors of the pixels up, down, left and right of the pixel are obtained as shown in the diagram and the following equation 10.

$$Px0 = N(x,y) \cdot N(x-1,y)$$

$$Px1 = N(x,y) \cdot N(x+1,y)$$

$$Py0 = N(x,y) \cdot N(x,y-1)$$

$$Py1 = N(x,y) \cdot N(x,y+1) \quad (10)$$

The following evaluations are carried out with respect to the inner products:

$$\text{Abs}(px0) < (1.0\_n\text{th}) \quad 11\text{-}1.$$

$$\text{Abs}(px1) < (1.0\_n\text{th}) \quad 11\text{-}2.$$

$$\text{Abs}(py0) < (1.0\_n\text{th}) \quad 11\text{-}3.$$

$$\text{Abs}(py1) < (1.0\_n\text{th}) \quad 11\text{-}4.$$

Here, "nth" is the adjustable threshold value. If the above inequality 11-1 or 11-2 is true, it is concluded that the pixel concerned is at an edge for the x-direction. If the above inequality 11-3 or 11-4 is true, it is concluded that the pixel concerned is at an edge for the y-direction.

Namely, the inner products of the normal vectors of pixels adjacent to each other in both of the x- and y-directions are calculated. If the values of the inner products are within the range of from 1.0 to the threshold value, it is judged that the pixel is not at the edge, while if they are out of the range of the threshold value, it is judged that the pixel is at the edge.

For example, when satisfying the following condition in the x-direction, it is judged that an edge extending in the y-direction exists at the left from the pixel concerned (direction in which x becomes smaller).

$$nx(x-1,y)*nx(x,y)+ny(x-1,y)*ny(x,y)+nz(x-1,y)*nz(x,y) < n\text{th} \quad (12)$$

When satisfying the following condition, it is judged that an edge extending in the y-direction exists at the right from the pixel concerned (direction in which x becomes larger).

$$nx(x-1,y)*nx(x,y)+ny(x+1,y)*ny(x,y)+nz(x+1,y)*nz(x,y) < n\text{th} \quad (13)$$

When satisfying the following condition, it is judged that an edge extending in the x-direction exists on the pixel concerned (direction in which y becomes smaller).

$$nx(x,y-1)*nx(x,y)+ny(x,y-1)*ny(x,y)+nz(x,y-1)*nz(x,y) < n\text{th} \quad (14)$$

When satisfying the following condition, it is judged that an edge extending in the x-direction exists below the pixel concerned (direction in which y becomes larger).

$$nx(x,y+1)*nx(x,y)+ny(x,y+1)*ny(x,y)+nz(x,y+1)*nz(x,y) < n\text{th} \quad (15)$$

Up to the above evaluations, one scan enables each pixel to be processed. Investigation of the existence of an edge independently with respect to the x- and y-directions and scanning in both of the vertical direction and the horizontal direction give useful information at the anti-aliasing of the processing after this.

The information as to at which of the left or right or at which of the up or down an edge exists is added to the information as to whether a pixel is at the edge obtained as described above. Accordingly, as the information, in addition to 1 bit of information indicating existence of an edge, 1 bit of information indicating on which side the edge exists is necessary, so at least 2 bits of information are generated.

In the present embodiment, as described above, the predetermined information is restored from the image after drawing the edge information for the x-direction and the y-direction in the screen coordinates, the processing content necessary for the anti-aliasing is determined from the obtained edge information, and the determined processing is carried out.

In the present embodiment, by scanning either or both of the information of the z-buffer obtained at the time of the drawing or the information of the normal vectors at each pixel or by using the information of the normal vectors restored from the information of the z-buffer, the anti-aliasing is applied to each pixel.

For example, at each scan, a state machine for holding the state and a counter for measuring the continuity of the edge are defined. By these two devices, for the pixel on each edge, by which ratio is the blending carried out with the pixel value of the adjacent pixel in which direction is determined. Then, the determined value is for the blending. This is carried out successively during the scan until the pixel value is updated.

According to this method, the amount of increase of the memory used for the purpose of the anti-aliasing can be kept small, and processing lowering the performance at the time of drawing is not added.

Below, an explanation will be given of the algorithm of this processing and the mounting format.

Algorithm

Figure 6A:
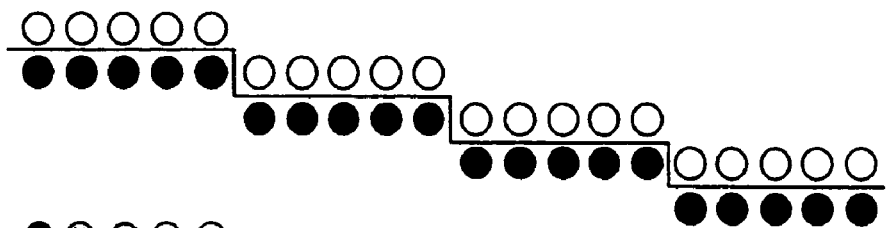
FIGS. 6A to 6D are views showing the most general patterns of edges needing anti-aliasing.
Figure 6B:
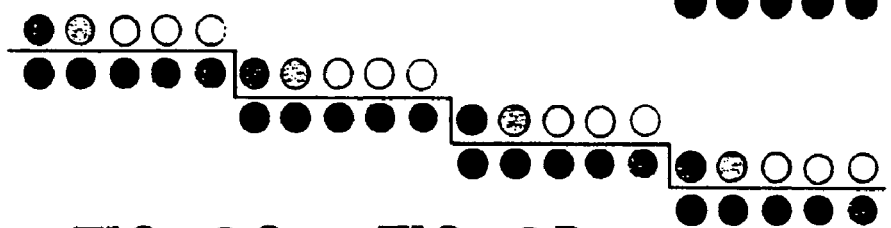
Figure 6C:
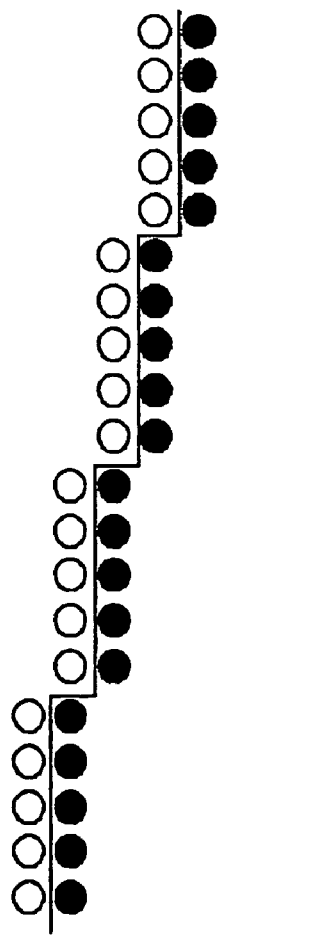
Figure 6D:
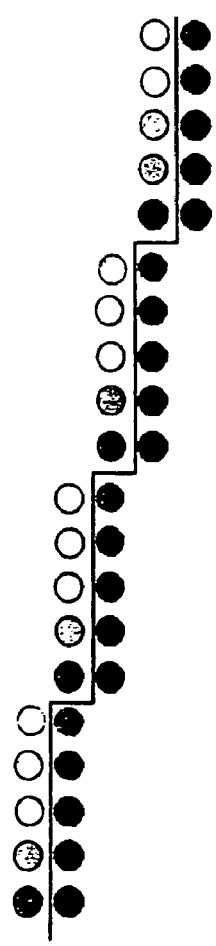

The most general shapes of edges becoming aliased are the patterns shown in FIGS. 6A and 6C. The edges of such patterns are blended out as shown in FIGS. 6B and 6D.

Specifically, as shown in FIG. 7, pixels sandwiching the edge are blended with each other. In this case, the area of a trapezoid in the figure when the length of the side of one pixel is 1.0 becomes the blend coefficient.

Using the case of FIG. 7 as an example, when the pixel values are A0, A1, A2, B0, B1, and B2, how each pixel value changes is shown below. Here, the blend coefficients corresponding to the pixels are a0, a1, a2, b0, b1, and b2.

$$A0 \rightarrow A0*(1-a0)+B0*a0$$

$$B0 \rightarrow B0*(1-b0)+A0*b0$$

$$a0 = 3.0*0.5*0.5*(1-2*2/(3*3))$$

$$b0 = 3.0*0.5*0.5*(1-1/(3*3))$$

$$A1 \rightarrow A1*(1-a1)+B1*a1$$

$$B1 \rightarrow B1*(1-b1)+A1*b1$$

$$a1 = 3.0*0.5*0.5*2*2(3*3)*(1-1*1/(2*2))$$

$$b1 = 3.0*0.5*0.5*2*2(3*3)*(1-1*1/(2*2))$$

$$A2 \rightarrow A2*(1-a2)+B2*a2$$

$$B2 \rightarrow B2*(1-b2)+A2*b2$$

$$a2 = 3.0*0.5*0.5*(1*1/(3*3))$$

$$b2 = 3.0*0.5*0.5*(1-2*2/(3*3)) \quad (16)$$

If using the above coefficients, the shapes of the aliasing are completely eliminated even at the edge close to the horizontal or vertical.

Figure 8:
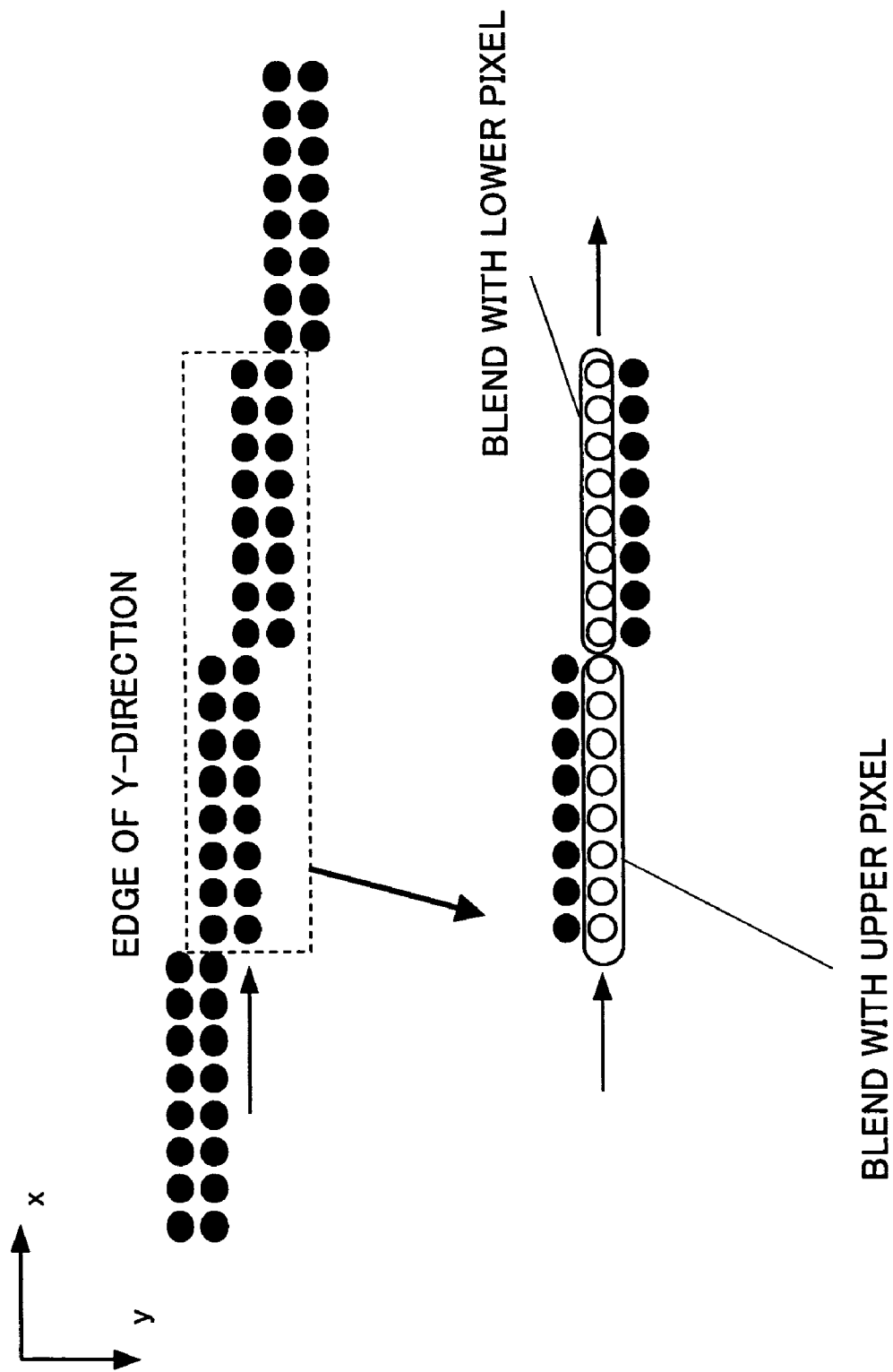
FIG. 8 is a view for explaining a search method of an aliasing pattern according to the present embodiment.

It is necessary to find the pattern of the edge (aliasing pattern) for the above processing. Basically, this becomes the processing for finding the pattern of edge as shown in FIG. 8 independently in the vertical direction and the horizontal direction.

For this purpose, it is also possible to define the mask and perform pattern matching, but the following method can also be employed. It is also possible to combine the following method and pattern matching.

When taking note a certain line, that line is scanned from either end point. In the middle of the scan, sometimes a pixel which becomes the edge is found in a direction vertical to the line.

For example, when scanning in the x-direction, this is a pixel which becomes the edge in the y-direction. When scanning in the y-direction, this is a pixel which becomes the edge in the x-direction. The "edge in the x- (y-)direction" means that the second differentiation of z, the direction of the normal vector, etc. sharply changes in that direction.

When such a pixel is found, the probability that a pixel which forms the edge will also be found in a direction vertical to the line direction among the pixels of the line above or below the related line is extremely high.

Further, when continuing the scan, several pixels forming the edge will continue in the direction vertical to the related line and pixels which form the edge will continue in the vertical direction at either the upper or lower pixels as well. At a certain point of time, when the pixels of the related line continue forming the edge in the vertical direction, the line forming the edge in the vertical direction among an upper and lower line will reverse. After such a state continues for several pixels, in the related line, the pixels of the edge in the vertical direction will disappear. This is how to find one aliasing pattern.

The pixels which form the edge in the vertical direction in the related line are blended with either the upper or lower pixels forming the edge in the vertical direction and then are written back.

In the present embodiment, when finding such a pattern, in the scan of each line, for example the state machine and the counter are used.

The state machine shows at which position of which shape of pattern a pixel in processing is at, while the counter measures a length from the start point of the aliasing pattern to the change point (portion where upper and lower edges reverse) and a length from the change to when the aliasing pattern ends, for each pixel being processed.

By this, at which portion of which length of an aliasing pattern the edge exists can be shown with respect to each pixel, and the positions of the other pixel to be blended with and the coefficients of blending can be calculated.

In the present method, how many types of patterns can be recognized has an effect on the quality of the processing. Especially, it is necessary to find suitable processing for when two or more edges overlap or become close.

Figure 9:
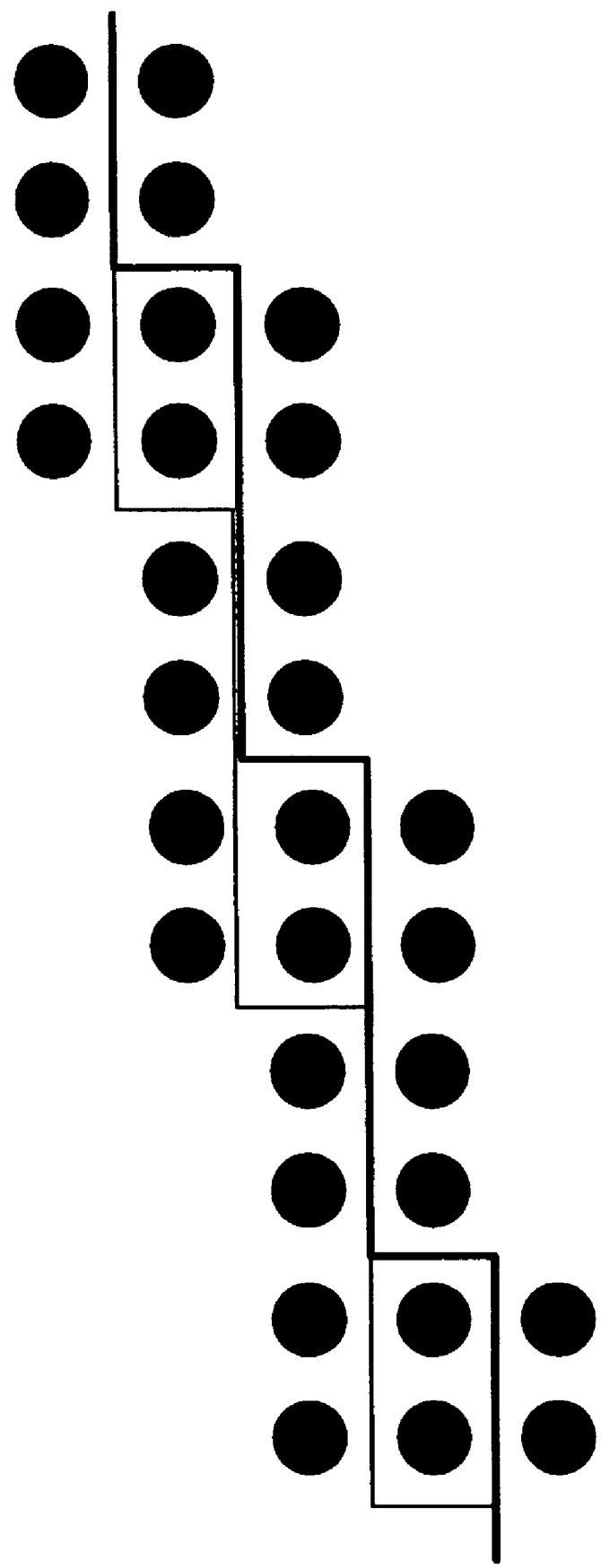
FIG. 9 is a view for explaining a method of finding overlapping edge patterns and suitably processing them when also acquiring edge information of a plurality of upper and lower lines other than a line in question at the time of line scanning according to the present embodiment.
Figure 10:
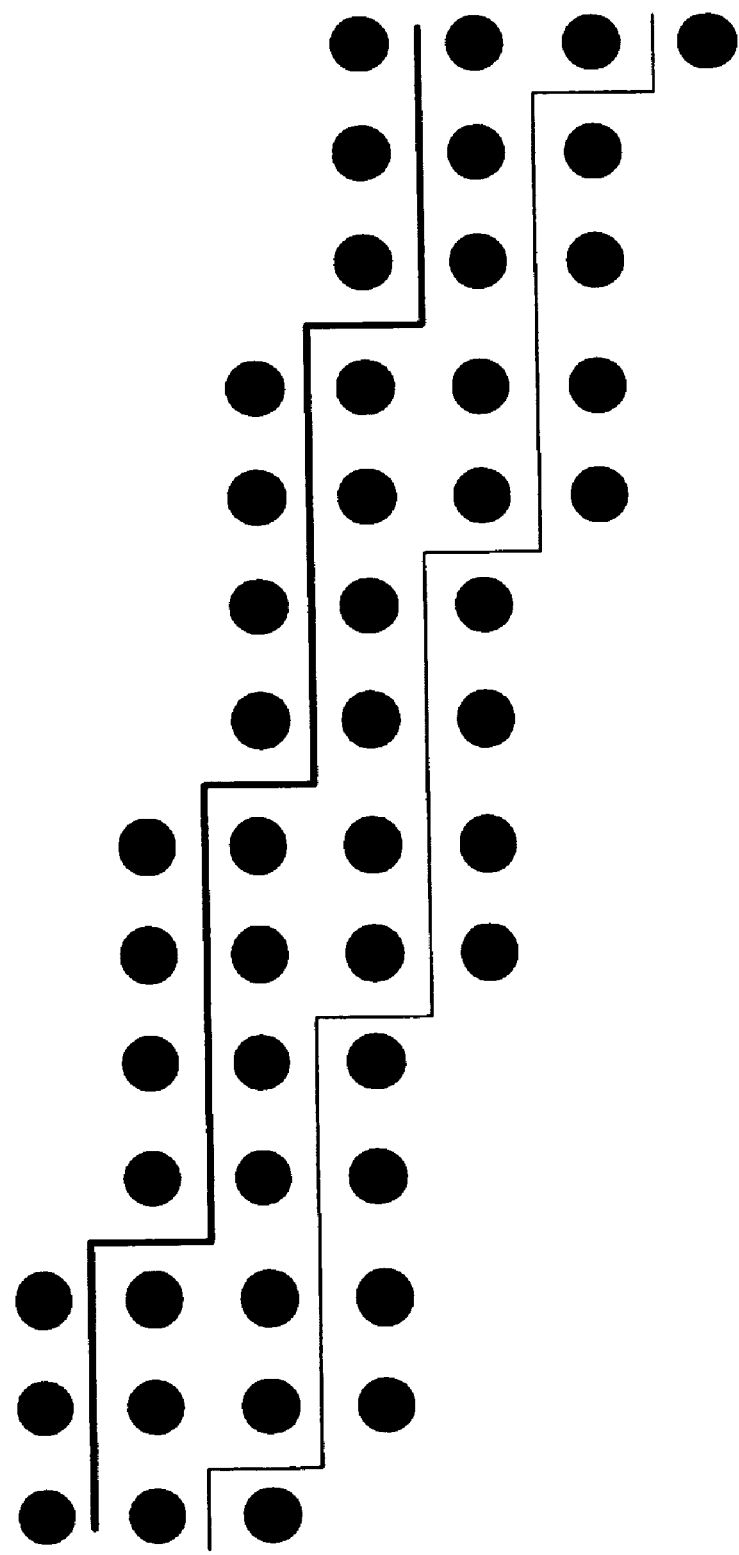
FIG. 10 is a view for explaining a method of finding a pattern of a close edge and suitably processing the same when also acquiring edge information of a plurality of upper and lower lines other than a line in question at the time of line scanning according to the present embodiment.
Figure 11:
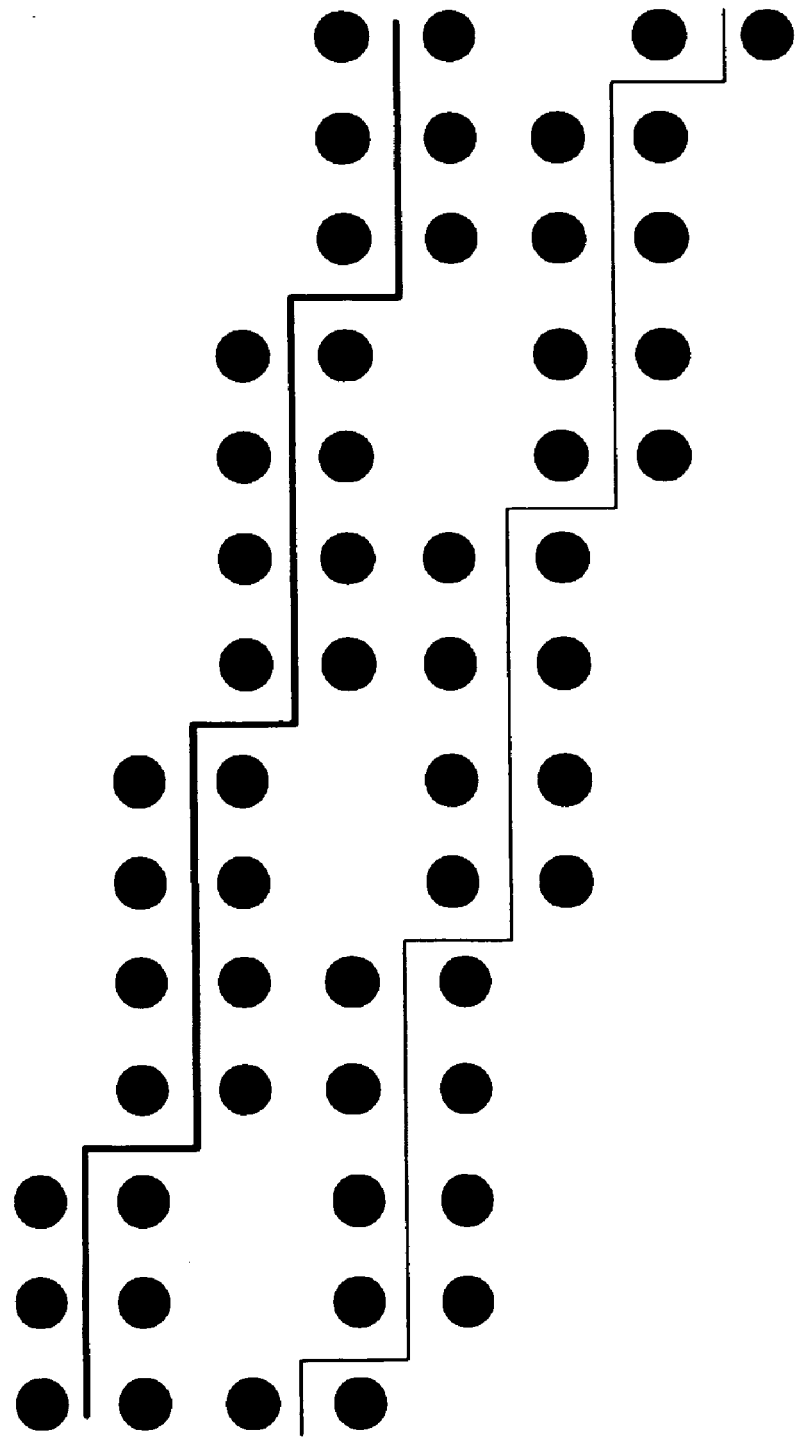
FIG. 11 is a view for explaining a method of finding a pattern of a close edge and suitably processing the same when also acquiring edge information of a plurality of upper and lower lines other than a line in question at the time of line scanning according to the present embodiment.
Figure 13A:
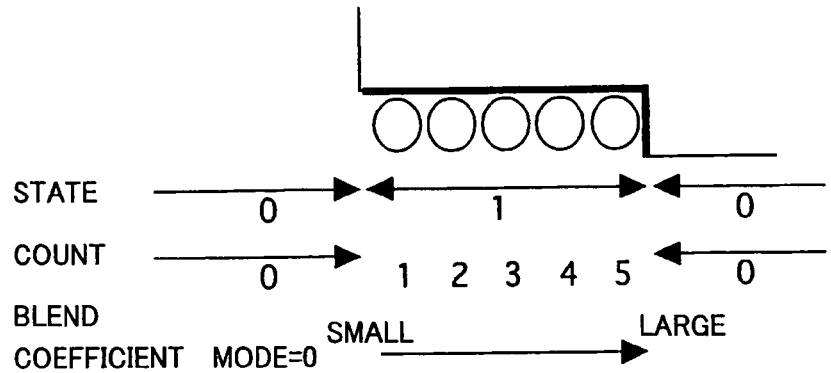
FIGS. 13A to 13D are views for diagrammatically showing motion of a state machine and blending according to the present embodiment.
Figure 13B:
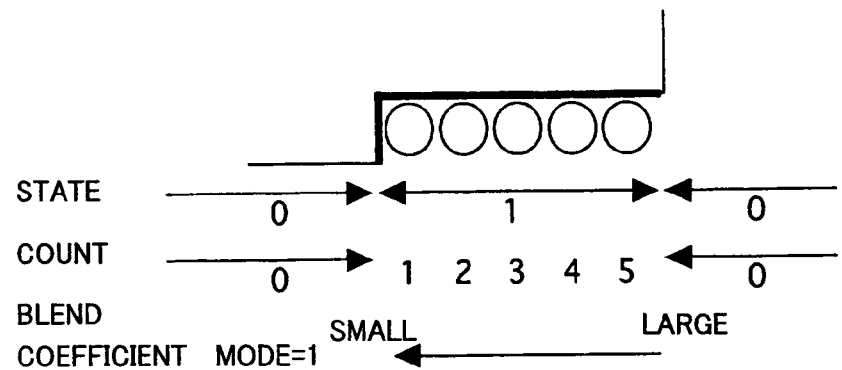
Figure 13C:
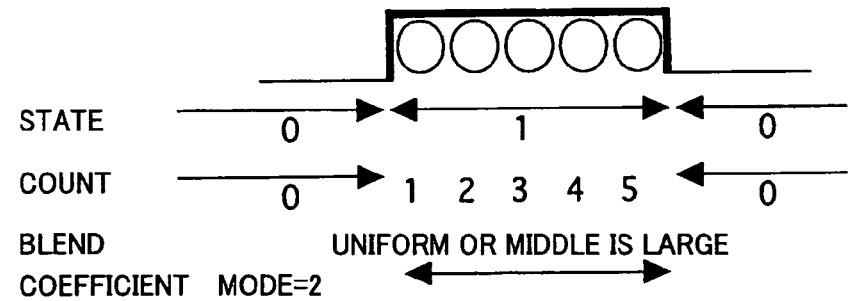
Figure 13D:
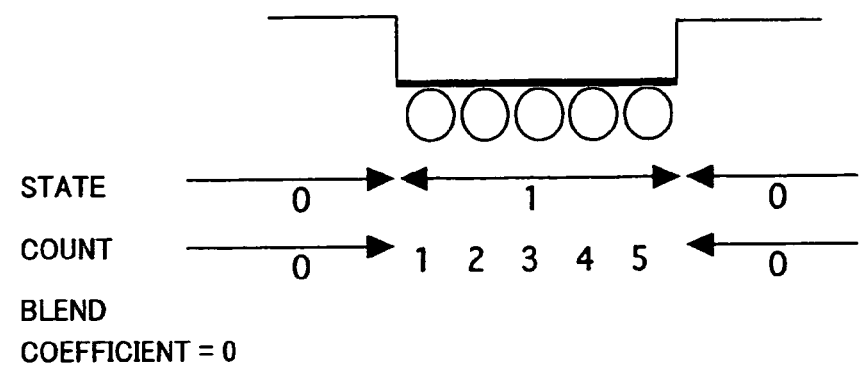

Due to this, in the present embodiment, the edge information of a plurality of upper and lower lines are also acquired in addition to that the related line at the time of the line scan. For example, in order to find the pattern of overlapped edges as shown in FIG. 9 and the close edges as shown in FIG. 10 and FIG. 11 and suitably process the same, it is necessary to simultaneously look at the information of at least two upper and two lower lines or five lines in total.

FIG. 12 is a view conceptually showing a specific mode of mounting for realizing the edge information generation and the anti-aliasing explained above.

This anti-aliasing system 200 has, as shown in FIG. 12, a z-buffer 201, a normal vector buffer 202, a first second-differentiation circuit 203 for second differentiation of the z-value obtained by scanning the z-buffer 201 horizontally (in x-direction), a first inner product calculation circuit 204 for taking the inner product of the normal vectors obtained by scanning horizontally (in x-direction), a first edge judgment circuit 205 for edge judgment based on the results of the second differentiation circuit 203 and the inner product calculation circuit 204, a first state machine 206 indicating at which position of which shape of pattern a pixel in processing exists based on the judgment result of the first edge judgment circuit 205, a first counter 207 for measuring the length from the start point of the aliasing pattern to a change point (portion where upper and lower edges reverse) and the length from the change point to when the aliasing pattern ends, a second second-differentiation circuit 208 for second differentiation of the z-value obtained by scanning the z-buffer 201 vertically (in y-direction), a second inner product calculation circuit 209 for taking the inner product of the normal vectors obtained by scanning vertically (in y-direction), a second edge judgment circuit 210 for edge judgment based on the results of the second differentiation circuit 208 and the inner product calculation circuit 209, a second state machine 211 indicating at which position of which format of pattern does the pixel during exist based on the judgment result of the second edge judgment circuit 210, a second counter 212 for measuring the length from the start point of the aliasing pattern to a change point (portion where upper and lower edges reverse) and the length from the change point to when the aliasing pattern ends, a display buffer 213 for storing the completed computer graphic (CG) image, a display buffer 214 for storing the image after the anti-aliasing, and a flag register 215.

Assume that the anti-aliasing system 200 of FIG. 12 starts the processing from the state where the following exist as prerequisites:

1. A three-dimensional computer graphic image finished being drawn;
2. A z-buffer 201 completed together with the drawing; and
3. A normal vector buffer 202 completed together with the drawing.

The above "buffers" means memories of the data which each pixel has. The z-buffer 201 is a by-product of drawing as explained above and originally information which is discarded at the same time as the end of the drawing. In the present embodiment, this is reused.

Concerning the normal vector buffer 202, a normal vector can be restored by calculation from the z-buffer 201 and the screen coordinates, so a normal vector buffer is not necessary when that processing is included.

In the anti-aliasing system 200 of FIG. 12, the vertical scan and the horizontal scan are carried out simultaneously in parallel. Also, the processing is advanced together with each scan.

In each scan, the second differentiation of the z-value is found at the first and second second differentiation circuits 203 and 208, and the inner product of the normal vectors of adjacent pixels is calculated at the first and second inner product calculation circuits 204 and 209.

Then, the first and second edge judgment circuits 205 and 210 judge if the pixel concerned is at the edge for each of the x-direction and y-direction based on the results of the first and second second differentiation circuits 203 and 208 and the first and second inner product calculation circuits 204 and 209 and send the judgment results to the state machines 206 and 211.

The state machines 206 and 211 judge which portion of which pattern of edge the pixel in processing is at and hold the information of the edge. Then, the counters 207 and 212 measure the length of the edge.

When the pattern of one edge ends in that line, the state machines 206 and 211 and the counters 207 and 212 are cleared, the calculation of the blend coefficients, determination of the other pixels to be blended with, etc. are performed going back to the pixels behind the line, each pixel is blended, and the data is written in the display buffer serving as the memory for storing the image after processing.

At that time, the processing of the horizontal scan and the processing of the vertical scan are carried out in parallel, so for each pixel, it is necessary to hold 1 bit of flag information indicating if the other scan has already processed the pixel concerned.

If the flag does not stand in the flag register 215, the pixel value of the "completed CG image" of the buffer 213 is blended with, while if it stands, the pixel value is read out from the "image after anti-aliasing" of the buffer 214, that value is blended with, and then the data is written back.

Note that sometimes only the information of the z-buffer is used without the normal buffer and without normal restoration.

Further, the width of the scan need only be three lines so as to detect an ordinary edge pattern, but it is necessary to simultaneously scan at least five lines in order to separate overlapped edges etc. The present invention does not exclude the possibility of any number of lines being simultaneously scanned as the plurality of lines.

Below, an explanation will be given of one example of the state machine.

The state machine explained here uses three variables of "state", "count", and "parity".

Further, "next#state" indicates a value next taken by the state.

The scan advances by one pixel at a time in the scan direction. The z-buffer, normal buffer, or edge information buffer (meaning the memory storing the edge information obtained by the scan of the z-buffer etc.) is scanned in the x-direction and y-direction to change the variable "state" by the read data. The clearing of the counter, count up, and retention of values are determined in accordance with the variable "state".

```
Case of x-direction scan
When state==0
    if (pixel forming edge in y-direction)
        next#state=1
        count=1;
        if (pixel forming edge also in x-
            direction)
                parity=1;
        else
                parity=0;
    else
        next#state=0;
        count=0;
When state==1
    if (pixel forming edge in y-direction)
        next#state=1;
            count=count+1;
        else
            next#state=0;
            if (parity==pixel forming edge in
1&&xdirection)
                Blending going back by amount of pixels
of count when mode=2
                if (parity==not edge in 1&&xdirection)
                Blending going back by amount of pixels
of count when mode=1
                if (parity==pixel forming edge in
0&&xdirection)
                Blending going back by amount of pixels
of count when mode=0
                if (parity==not edge in 0&&xdirection)
                Nothing done
```

When drawing the motion of the state machine and the blending by a figure, they become as shown in FIGS. 13A to 13D.

The illustrated example is an example where the upper and side edges are viewed by the scan in the x-direction.

The blending is carried out backward until the position when the variable state changes from 1 to 0.

How to Find Blend Coefficients

When mode=0, the value of the blend coefficient of the pixel having a larger count is a value near 0.5. The blending value of the pixel having a younger (smaller) count approaches a value near 0. The method of this calculation can be selected from a variety of methods.

In the above example, for example the method of making the blend coefficient of the pixel of the count C C/5*0.5 is the simplest method. Other than this, a method of making the area of the trapezoid the blend coefficient as shown in for example FIG. 7 is possible.

At this time, the equation becomes as follows:

$$\text{blend coefficient} = 0.5*0.5/Len*(Len-C+1)^2-(Len-C)^2 \quad (17)$$

Len is 5 in the present example.

When mode=1, the relative magnitudes of the count C and the blend coefficient become inverse to those when mode=0.

When mode=2, even if uniform at an appropriate value from 0 to 0.5, when the values are set so that the blend coefficient at the middle (near C=3 in this example) becomes slightly larger, the result appears as a natural finish.

Note that the state machine explained here is only one example.

Basically, the state machine performs processings in the x-direction and the y-direction. At each scan, a state machine is provided sensing the shape of the edge and the number of pixels is counted. As a result of the operation of the state machines, the pixels are processed backward.

As a method of selecting or mixing the x-direction blending and the y-direction blending, it is possible to employ the following methods:

The method of comparing blend coefficients before blending and performing the processing for only a larger one;

The method of comparing blend coefficients before blending and performing the processing for only a smaller one;

The method of equally mixing both processings;

The method of giving priority to a previous processing among x-direction processing and y-direction processing shifted in time, at which time a memory for storing 1 bit indicating that processing for every pixel becoming necessary;

The method of giving priority to processing among x-direction processing and y-direction processing shifted in time according to the magnitude of the blend coefficients, in which case a memory for storing the blend coefficient for every pixel becoming necessary; and The method of equally blending the x-direction processing and y-direction processing shifted in time, in which case a memory for storing the blend coefficient for every pixel becoming necessary.

Figure 14:
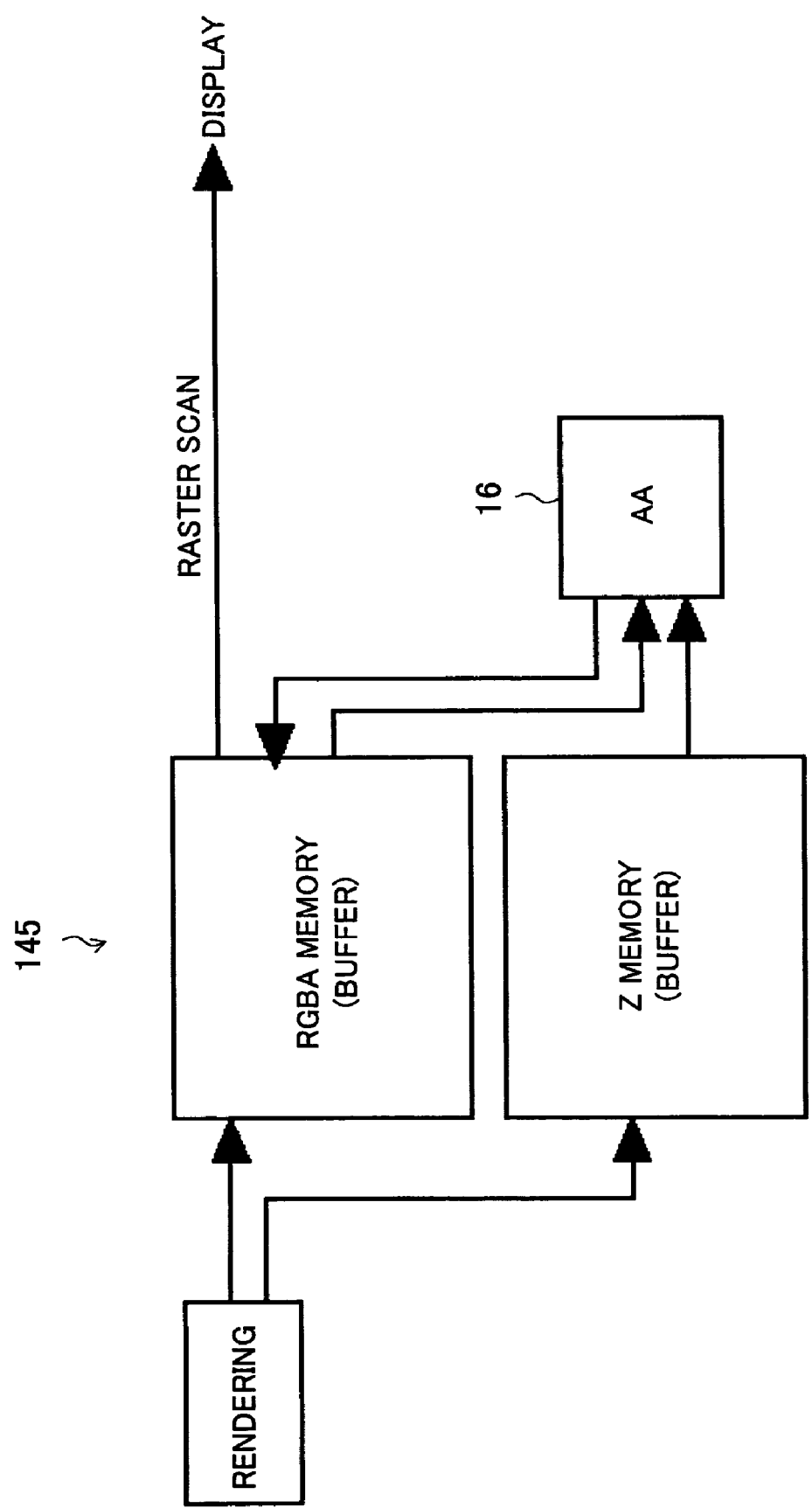
FIG. 14 is a view showing a case of changing an image on the memory for the RGB image as a result of rendering and transferring it to a display after the end.

FIG. 14 and FIG. 15 are conceptual views of a case of complete post-processing after drawing using only the z-buffer. In this case, the CRT control circuit 16 of FIG. 1 accesses the graphic memory 145 through the memory I/F circuit 144 to scan the z-buffer and applies the anti-aliasing to each pixel by using the z-value information.

FIG. 14 shows a case where the RGB image as the result of the rendering is changed on the memory by the CRT control circuit 16 and transferred to the display after that.

FIG. 15 shows a case of raster scanning for displaying the RGB image as the result of the rendering on a display, in parallel and in synchronization, scanning the z-buffer and transferring the data to the display, and, at that time, changing the image on the memory by the CRT control circuit 16 and transferring the data to the display after the end.

Both of FIG. 14 and FIG. 15 use only the z-buffer. No additional processing is used for the rendering. The entire processing is carried out as post-processing.

At the time of edge information extraction, specifically the following two types of edges are distinguished, and different processings are carried out.

Figures 16A, 16B, 16C, 16D, 16E:
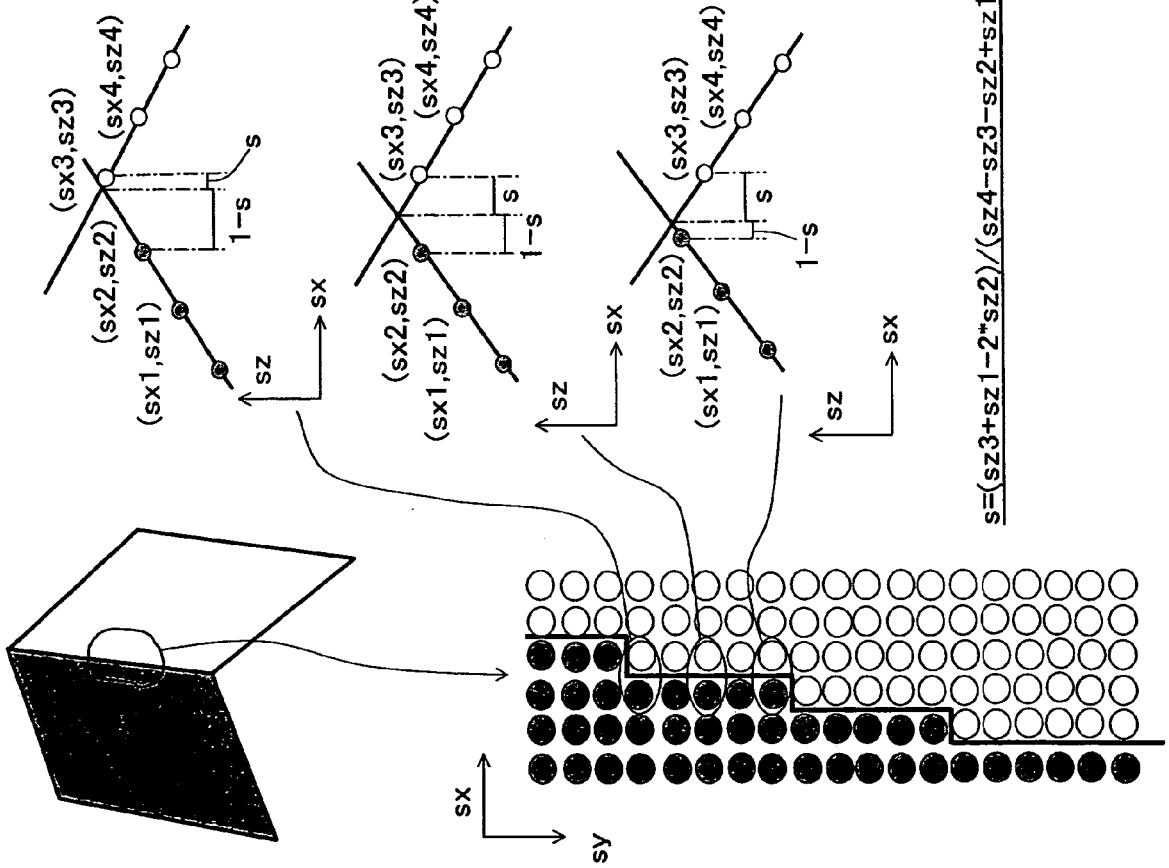
FIGS. 16A to 16E are views for explaining edge extraction of a case of a boundary of adjacent planes.

The first processing is the processing of the case of the boundary of the planes adjacent to each other as shown in FIG. 16.

The second processing is the processing of the case of the boundary between an object and the background as shown in FIG. 17.

The threshold values of the second differentiation of z are different between the first processing and the second processing.

First Processing

In the first processing, the blend coefficient is accurately found.

As shown in FIG. 16, the z-value of a 1×5+5×1 cross shape centered on the pixel concerned is read out.

Then, it is judged if the edge of a boundary of mutually adjacent planes exists between the pixel concerned and a pixel contacting the former. Also, the blend coefficient is calculated simultaneously with this judgment.

The second differentiation is used for the judgment. The second differentiation is independently calculated and used for the x-direction and y-direction.

In this case, use is made of two types of threshold values.

The information for the second processing is generated simultaneously with this first processing.

In the example of FIG. 16, the s used as the blend coefficient becomes as follows:

$$s=(sz3+sz1-2*sz2)/(sd4-sz3-sz2+sz1) \tag{18}$$

Second Processing

The information of the 1×n+n×1 cross centered on the pixel concerned is read out. Note, n is the mask. The information referred to here means the information generated in the first processing.

When the edge of the boundary between an object and the background exists between the pixel concerned and a pixel contacting this, the number of pixels forming the edge in the mask is counted.

The blend coefficient is calculated from that number.

Flow of Processing

The following two loops are sequentially carried out.

First Loop

In the first loop, the following processing is sequentially carried out with respect to all pixels.

The edge extraction and the blending of the edge relating to the first processing are carried out. This processing is performed for all pixels by the 1×5+5×1 mask.

Finding the second differentiation of z for the pixel concerned for the x- and y-directions.

Finding the second differentiations of z for the four pixels up, down, left, and right from the pixel concerned for the x- and y-directions.

Detecting the edge relating to the first processing (zdev and zdev0 are used as threshold values) for the x- and y-directions.

Detecting the edge relating to the second processing (zdev1 is used as the threshold value) for the x- and y-directions.

Blending to update the RGB buffer by using the detection result of the edge relating to the first processing.

Leaving one bit indicating the result of the edge detection relating to the second processing and if the blending of the first processing was carried out in the memory (with respect to all pixels).

Second Loop

In the second loop, the following processing is sequentially carried out with respect to all pixels.

The blending of the edge relating to the second processing is carried out. This processing is performed for all pixels by the 1×n+n×1 mask . . . n is the mask length.

Counting in the x-direction and the y-direction by only the mask while viewing the variable state.

Counting four types of values.

Finding the blend coefficient from the above four types of counts to perform the blending and update the RGB buffer.

At this time, if the flag of the blending of the first processing stands, the blend coefficient is made 0.

The first loop and the second loop are independent loops.

Next, an explanation will be given of the counting of the second loop in relation to FIG. 17.

Here, the mask n is 7.

In the figure, "Len=min((maskLen−1)/2,L1)" enables the minimum value (min value) to be learned according to whether the end of L1 is reached first or the end of the mask is reached first previous when counting the content of the mask.

maskLen is 7 in FIG. 17, and n here.

Based on the number of pixels shown in the figure, the value found by the following equation is defined as the blend coefficient:

$$\alpha=(\text{number of black pixels}-\text{Len}/(4*(\text{Len}+1))) \tag{19}$$

Note that the method of finding the coefficient given above is only one example.

Basically, the method comprises classifying the pixels so that there are as many gradations of the blend coefficients as possible for the pixels in the mask of the given mask, counting them, and finding the coefficients by using them.

Next, an explanation will be given of the operation by the above configuration. Here, use is made of only the z-buffer. There is no additional processing for the rendering. The explanation will be given taking as example the case of complete post-processing.

In the three-dimensional computer graphic system 10, the graphic drawing and other data is given from the main memory 12 of the main processor 11, or the I/O interface circuit 13 receiving the graphic data from the outside, to the rendering circuit 14 via the main bus 15.

Note that, in accordance with need, the graphic drawing and other data is subjected to geometry processing such as the coordinate conversion, clipping, and lighting in the main processor 11 etc.

The graphic data after the geometry processing becomes polygon rendering data S11 comprised of the vertex coordinates, the x, y, and z of the vertexes of the triangle, luminance values R, G, and B, and the texture coordinates s, t, and q corresponding to the pixels to be drawn.

This polygon rendering data S11 is sequentially transferred to the DDA set-up circuit 141 of the rendering circuit 14.

The DDA set-up circuit 141 generates change data indicating the difference etc. between a side of the triangle and the horizontal direction based on the polygon rendering data S11.

Specifically, it uses the value of the start point, the value of the end point, and the distance between them to calculate the change of the value to be found in the case of unit length movement and outputs the set-up data S141 including the change data to the triangle DDA circuit 142.

The triangle DDA circuit 142 uses the set-up data S141 including the change data to calculate the linear interpolated (z, R, G, B, α, s, t, q) data at each pixel inside the triangle.

Then, this calculated (z, R, G, B, α, s, t, q) data and the (x, y) data of each of the vertexes of the triangle are output as the DDA data S142 from the triangle DDA circuit 142 to the texture engine circuit 143.

Namely, the triangle DDA circuit 142 performs the rasterization for interpolating the image parameters (z, texture coordinate, color etc.) of all pixels included inside a polygon based on the image parameters found for the vertexes of the polygon.

The texture engine circuit 143 performs the operation of dividing the s data by the q data and the operation of dividing the t data by the q data for the (s, t, q) data indicated by the DDA data S142. Then, it multiplies the division results "s/q" and "t/q" with the texture sizes USIZE and VSIZE to generate the texture coordinate data (u, v).

Next, the texture engine circuit 143 outputs a read request including the generated texture coordinate data (u, v) to the memory I/F circuit 144 and reads the (R, G, B) data stored in the graphic memory 145 via the memory I/F circuit 144.

Next, the texture engine circuit 143 multiplies the (R, G, B) data of the read out (R, G, B) data and the (R, G, B) data included in the DDA data S142 from the former triangle DDA circuit 142 to generate the pixel data.

This pixel data is output from the texture engine circuit 143 to the memory I/F circuit 144.

Then, the memory I/F circuit 144 compares the z-data corresponding to the pixel data input from the texture engine circuit 143 and the z-data stored in the z-buffer and judges whether or not the image drawn by the input pixel data S145 is positioned closer (to the view point side) than the image written to the display buffer the previous time.

When the result of the judgment is that it is positioned closer, the z-data stored in the z-buffer is updated by the z-data corresponding to the image data.

Next, the memory I/F circuit 144 writes the (R, G, B) data to the display buffer of the graphic memory 145.

The data to be written (including also update) is written to the predetermined memory in parallel via the write system circuit.

The memory I/F circuit 144 calculates the memory block of the graphic memory 145 storing the texture corresponding to the texture address in the pixels to be drawn from then on by the texture address, issues the read request to only that memory block, and reads out the texture data.

In the same way in the drawing as well, the pixel data is read out from the corresponding address of the memory block storing the pixel data corresponding to the pixel address to which the data is to be drawn from then on so as to perform a modify write operation and after the modify operation is written back to the same address.

At the time of hidden plane processing, the depth data is read out from the corresponding address of the memory block storing the depth data corresponding to the pixel data to which the data is still to be drawn from then on for so as to perform a modify write operation and, if necessary, after the modify operation, is written back to the same address.

When displaying the image on a not shown CRT, the CRT control circuit 16 generates the display address in synchronization with the given horizontal and vertical synchronization frequencies and issues a request for transfer of the display data to the memory I/F circuit 144.

The memory I/F circuit 144, according to the request, transfers a certain amount of the display data to the CRT control circuit 16.

The CRT control circuit 16 stores the display data in a not shown display use FIFO etc. and generates RGB index values of RGB at constant intervals.

The CRT control circuit 16 stores the RGB values with respect to the RGB indexes inside it and transfers the RGB values for the index values to a not shown D/A converter.

Then, the RGB signals converted to analog signals at the D/A converter are transferred to the CRT.

In this case, the RGB image as the result of rendering is changed on the memory by the CRT control circuit 16 and then transferred to the display. Alternatively, the RGB image as the result of rendering is raster scanned for the display and in parallel and in synchronization the z-buffer is scanned and, at the time of the transfer to the display, the image is changed on the memory by the CRT control circuit 16, then transferred to the display.

When restoring the normal vector while scanning the z-buffer, the edge judgment is carried out while restoring the normal vector by scanning the z-buffer.

In this case, the vertical scan and the horizontal scan are carried out simultaneously in parallel with respect to for example the z-buffer. The processing is advanced together with the scans.

For example, the CRT control circuit 16 finds the second differentiation of the z-value in each scan and calculates the inner product of the normal vectors of pixels adjacent to each other inside.

Then, it judges if the pixel concerned is at the edge for each of the x-direction and y-direction based on the result of the second differentiation and the result of the inner product calculation. This judgment result is sent to for example the state machine.

The state machine judges which portion of which pattern of edge the pixel in processing is at and holds the information of the edge. Then, the counter measures the length of the edge.

When the pattern of one edge end within that line, the state machine and the counter are cleared, and the calculation of the blend coefficient, the determination of the other pixel to be blended wit, etc. are carried out going back to the pixels behind that line.

Then, the pixels are blended.

The image after the blending is written to the display buffer serving as the storage memory.

At that time, the processing of the horizontal scan and the processing of the vertical scan are carried out in parallel, so 1 bit of flag information indicating if the other scan was already performed for the pixel concerned is held for each pixel.

For example, if the flag does not stand in the flag register, the pixel value of the buffer "completed CG image" is blended with.

As opposed to this, if the flag stands, the pixel value is read out from the "image after the anti-aliasing", blended with, then written back.

As explained above, according to the present embodiment, good use is made of the properties of three-dimensional computer graphics and the information possessed at the time of the drawing is effectively used, so it becomes able to obtain extremely accurate edge information.

Further, since the processing is post-processing of the drawing, there is minimum additional processing requested with respect to the drawing itself. Additional processing is sometimes requested, but even in that case, the processing is not processing increasing the number of pixels covered, so the drawing speed is not made slower.

The processing can be performed by just the information of the z-buffer which is always generated when drawing three-dimensional computer graphics, so the number of memories required does not increase.

When considering the use for anti-aliasing, comparing with the conventional system, since all processing can be carried out as post-processing, there is little influence on the drawing speed. Further, accurate edge information can be used to extract the pattern of the edge, so there is no restriction on the mask size—a problem in a technique such as super sampling—and aliasing of a close to horizontal or vertical straight line-like edge can be removed very cleanly.

Note that, in the three-dimensional computer graphic system 10 shown in FIG. 1, the case where the geometry processing for generating the polygon rendering data was carried out at the main processor 11 was exemplified, but a configuration performing it at the rendering circuit 14 can also be employed.

Summarizing the effects of the invention, according to the present invention, the rendering of pixels other than the inherently necessary drawn pixels, such as the surrounding pixels, is unnecessary and edge information accurate enough to be able to be utilized for anti-aliasing can be extracted without inducing a drop in the drawing speed.

Further, there is the advantage that accurate anti-aliasing can be realized with a small memory, without any influence of the drawing order, and without inducing a drop in the drawing speed.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus for generating pixel data inside a drawn area of a screen coordinate system to perform rendering of an image based on image data stored in a memory, and then generating edge information and performing anti-aliasing, comprising:
   an edge information extracting means for extracting the edge information based on predetermined pixel data stored in the memory; and
   an anti-aliasing means for determining the content of processing required for anti-aliasing based on the edge information obtained by the edge information extracting means and executing the determined processing, wherein the anti-aliasing means further includes:
   a first means for detecting an aliasing pattern containing a pixel being processed from the edge information; and
   a second means for measuring a length, for each pixel being processed, from a start point of the detected aliasing pattern to a change point where a line among an upper and a lower line which forms an edge of the detected aliasing pattern changes from the upper line to the lower line or vice versa, and a length, for each pixel being processed, from the change point to where the detected aliasing pattern ends, and calculating a position of a pixel to be blended with the pixel being processed and a coefficient of blending based on the length from the start point and the length from the change point.

2. An image processing apparatus as set forth in claim 1, wherein the anti-aliasing means determines adjoining pixels for blending with pixels on an edge and a corresponding blending ratio and performs blending based on the determined pixels and the corresponding blending ratio.

3. An image processing apparatus as set forth in claim 1, wherein:
   the pixel data stored in the memory includes depth information; and
   the edge information extracting means finds a second differentiation of the depth information obtained as a result of scanning a depth information buffer of the memory storing the depth information and extracts edge information based on the second differentiation.

4. An image processing apparatus as set forth in claim 1, wherein:
   the generated pixel data includes a normal vector for every pixel;
   a normal vector buffer stores the normal vectors in said memory; and
   the edge information extracting means extracts the edge information based on normal vectors obtained as a result of scanning the normal vectors for the pixels stored in the normal vector buffer.

5. An image processing apparatus as set forth in claim 1, wherein:
   the pixel data drawn in the memory includes depth information; and
   the edge information extracting means restores the normal vector for each pixel from the depth information obtained as a result of scanning the depth information buffer of the memory storing the depth information and screen coordinates, and extracts the edge information based on the restored normal vectors.

6. An image processing apparatus as set forth in claim 3, wherein the edge information extracting means extracts edge information of a plurality of lines near a line being examined.

7. An image processing apparatus as set forth in claim 4, wherein the edge information extracting means extracts edge information of a plurality of lines near a line being examined.

8. An image processing apparatus as set forth in claim 5, wherein the edge information extracting means extracts edge information of a plurality of lines near a line being examined.

9. An image processing method for generating pixel data in a drawn area of a screen coordinate system to perform rendering of an image based on image data stored in a memory and then generating edge information and performing anti-aliasing, comprising the steps of:
    extracting the edge information based on predetermined pixel data stored in the memory; and
    determining the content of processing required for anti-aliasing based on the edge information and executing the determined processing, wherein the determining step further includes:
    detecting an aliasing pattern containing a pixel being processed from the edge information;
    measuring a length, for each pixel being processed, from a start point of the detected aliasing pattern to a change point where a line among an upper and a lower line which forms an edge of the detected aliasing pattern changes from the upper line to the lower line or vice versa, and a length, for each pixel being processed, from the change point to where the detected aliasing pattern ends; and
    calculating a position of a pixel to be blended with the pixel being processed and a coefficient of blending based on the length from the start point and the length from the change point.

10. An image processing method as set forth in claim 9, wherein the determining step determines adjoining pixels for blending with pixels on an edge and a corresponding blending ratio and performs blending based on the determined pixels and the corresponding blending ratio.

11. An image processing method as set forth in claim 9, wherein:
    the pixel data stored in the memory includes depth information; and
    the extracting step further comprises scanning a depth information buffer of said memory storing the depth information, finding a second differentiation of the depth information obtained, and extracting edge information based on the second differentiation.

12. An image processing method as set forth in claim 9, wherein:
    the generated pixel data includes a normal vector for every pixel;
    a normal vector buffer stores the normal vectors in the memory; and
    the extracting step further comprises scanning the normal vector for each pixel stored in the normal vector buffer and extracting the edge information based on normal vectors obtained.

13. An image processing method as set forth in claim 9, wherein:
    the pixel data drawn in the memory includes depth information; and
    the extracting step further comprises restoring the normal vector for each pixel from the depth information obtained as a result of scanning the depth information buffer of the memory storing the depth information and the screen coordinates and extracting the edge information based on the restored normal vectors.

* * * * *